(12) United States Patent
Gochev et al.

(10) Patent No.: US 10,933,869 B2
(45) Date of Patent: *Mar. 2, 2021

(54) AUTONOMOUS VEHICLE MOTION CONTROL SYSTEMS AND METHODS

(71) Applicant: UATC, LLC, San Francisco, CA (US)

(72) Inventors: Kalin Vasilev Gochev, Pittsburgh, PA (US); Michael Lee Phillips, Pittsburgh, PA (US); David McAllister Bradley, Pittsburgh, PA (US); Bradley Nicholas Emi, Westlake Village, CA (US)

(73) Assignee: UATC, LLC, San Francisco, CA (US)

( * ) Notice: Subject to any disclaimer, the term of this patent is extended or adjusted under 35 U.S.C. 154(b) by 347 days.

This patent is subject to a terminal disclaimer.

(21) Appl. No.: 15/865,790

(22) Filed: Jan. 9, 2018

(65) Prior Publication Data

US 2019/0161080 A1 May 30, 2019

Related U.S. Application Data

(60) Provisional application No. 62/592,024, filed on Nov. 29, 2017.

(51) Int. Cl.
*B60W 30/095* (2012.01)
*G05D 1/00* (2006.01)
*G05D 1/02* (2020.01)
*G08G 1/16* (2006.01)
*B60W 50/00* (2006.01)

(52) U.S. Cl.
CPC .... *B60W 30/0956* (2013.01); *B60W 50/0097* (2013.01); *G05D 1/0088* (2013.01); *G05D 1/0214* (2013.01); *G08G 1/166* (2013.01); *B60W 2554/00* (2020.02); *B60W 2720/24* (2013.01); *G05D 2201/0213* (2013.01)

(58) Field of Classification Search
CPC ......... B60W 30/0956; B60W 50/0097; B60W 2250/10; B60W 2720/24; G05D 1/0214; G05D 2201/0213; G08G 1/166
USPC .......................................................... 701/23
See application file for complete search history.

(56) References Cited

U.S. PATENT DOCUMENTS

| 7,734,387 B1 | 6/2010 | Young et al. |
| 7,979,174 B2 | 7/2011 | Fregene et al. |
| 9,244,462 B2 | 1/2016 | Pedersen |
| 9,340,207 B2 | 5/2016 | Nagasaka et al. |

(Continued)

*Primary Examiner* — Gertrude Arthur Jeanglaude
(74) *Attorney, Agent, or Firm* — Dority & Manning, PA

(57) ABSTRACT

Systems and methods for controlling the motion of an autonomous are provided. In one example embodiment, a computer-implemented method includes obtaining data associated with an object within a surrounding environment of an autonomous vehicle. The data associated with the object is indicative of a predicted motion trajectory of the object. The method includes determining a vehicle action sequence based at least in part on the predicted motion trajectory of the object. The vehicle action sequence is indicative of a plurality of vehicle actions for the autonomous vehicle at a plurality of respective time steps associated with the predicted motion trajectory. The method includes determining a motion plan for the autonomous vehicle based at least in part on the vehicle action sequence. The method includes causing the autonomous vehicle to initiate motion control in accordance with at least a portion of the motion plan.

20 Claims, 7 Drawing Sheets

(56) References Cited

U.S. PATENT DOCUMENTS

| | | |
|---|---|---|
| 9,718,466 B2 | 8/2017 | Kim et al. |
| 10,156,850 B1 * | 12/2018 | Ansari .................. G08G 1/166 |
| 10,372,130 B1 * | 8/2019 | Kaushansky ........ G05D 1/0221 |
| 2018/0089563 A1 * | 3/2018 | Redding ............. G06F 16/9027 |

* cited by examiner

AUTONOMOUS VEHICLE MOTION CONTROL SYSTEMS AND METHODS

PRIORITY CLAIM

The present application is based on and claims priority to U.S. Provisional Application 62/592,024 having a filing date of Nov. 29, 2017, which is incorporated by reference herein.

FIELD

The present disclosure relates generally to improved motion control of an autonomous vehicle based on the future locations of objects within the vehicle's surroundings.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of controlling autonomous vehicle motion. The method includes obtaining, by a computing system including one or more computing devices, data associated with an object within a surrounding environment of an autonomous vehicle. The data associated with the object is indicative of a predicted motion trajectory of the object. The method includes determining, by the computing system, a vehicle action sequence based at least in part on the predicted motion trajectory of the object. The vehicle action sequence is indicative of a plurality of vehicle actions for the autonomous vehicle at a plurality of respective time steps associated with the predicted motion trajectory. The method includes determining, by the computing system, a motion plan for the autonomous vehicle based at least in part on the vehicle action sequence. The method includes causing, by the computing system, the autonomous vehicle to initiate motion control in accordance with at least a portion of the motion plan.

Another example aspect of the present disclosure is directed to a computing system for controlling autonomous vehicle motion. The computing system includes one or more processors and one or more non-transitory computer-readable media that collectively store instructions that when executed by the one or more processors cause the one or more processors to perform operations. The operations include obtaining data associated with an object within a surrounding environment of an autonomous vehicle. The data associated with the object is indicative of a predicted motion trajectory of the object. The operations include determining, at each respective time step of a plurality of time steps, whether the object is blocking or not blocking the autonomous vehicle based at least in part on the predicted motion trajectory of the object and a motion trajectory of the autonomous vehicle. The operations include determining a vehicle action sequence for the autonomous vehicle based at least in part on data indicative of whether the object is blocking or not blocking the autonomous vehicle at each respective time step. The operations include determining a motion of the autonomous vehicle based at least in part on the vehicle action sequence.

Yet another example aspect of the present disclosure is directed to an autonomous vehicle. The autonomous vehicle includes a blocking model configured to determine whether an object within a surrounding environment of the autonomous vehicle is blocking or not blocking the autonomous vehicle at a time along a predicted motion trajectory of the object. The autonomous vehicle includes a vehicle action model that is configured to determine a plurality of vehicle actions for the autonomous vehicle. The autonomous vehicle includes one or more processors and one or more non-transitory computer-readable media that collectively store instructions that, when executed by the one or more processors, cause the one or more processors to perform operations. The operations include obtaining data associated with the object within the surrounding environment of the autonomous vehicle. The operations include determining the plurality of vehicle actions for the autonomous vehicle based at least in part on the data associated with the object, the blocking model, and the vehicle action model. The operations include determining a motion for the autonomous vehicle based at least in part on the plurality of vehicle actions.

Other example aspects of the present disclosure are directed to systems, methods, vehicles, apparatuses, tangible, non-transitory computer-readable media, user interfaces, and memory devices for controlling autonomous vehicles.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
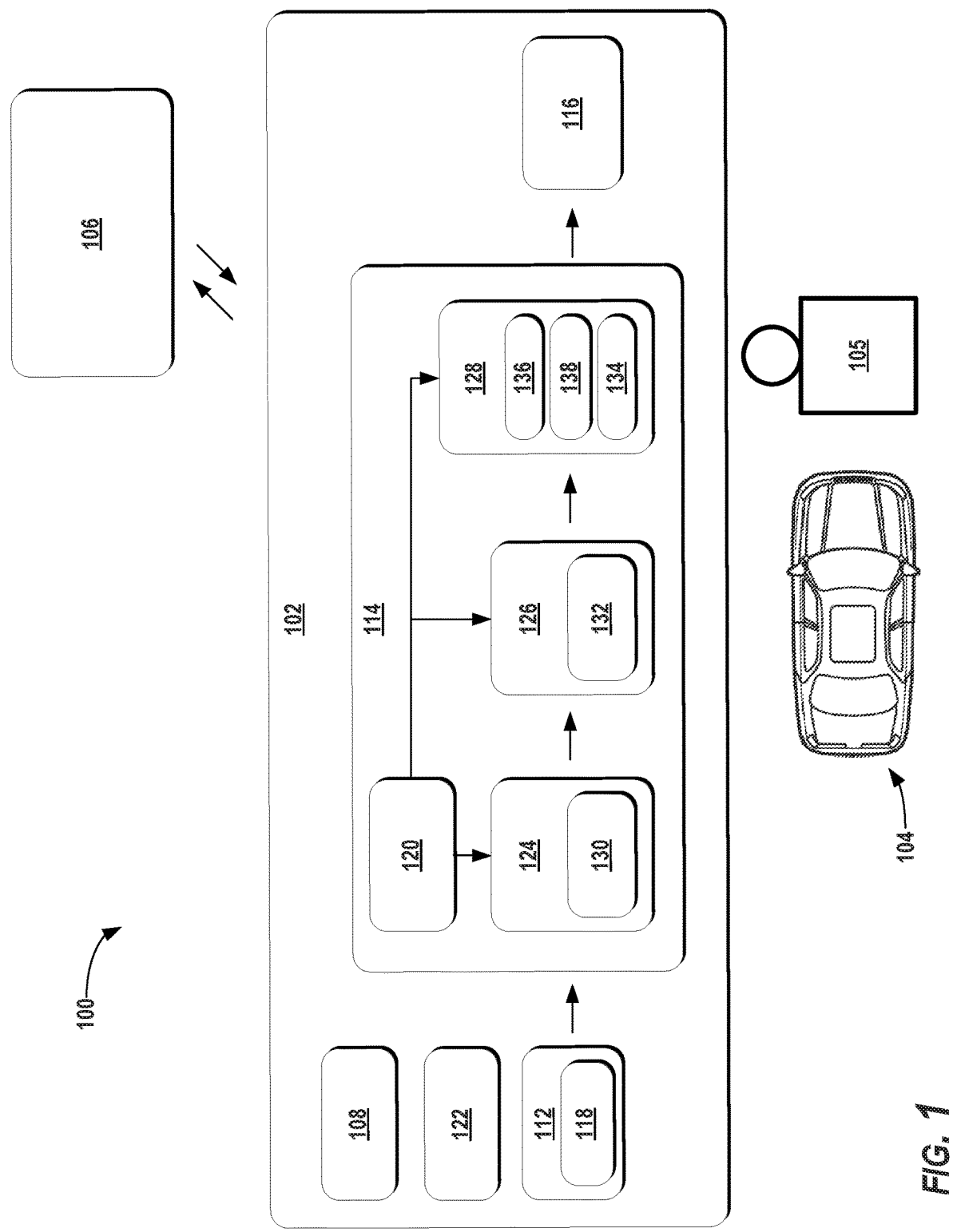
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods that improve the motion control of a fully or partially autonomous vehicle by determining a sequence of vehicle actions for an object within the vehicle's surrounding environment. In particular, the systems and methods of the present disclosure can determine how an autonomous vehicle should react to the presence of an object (e.g. pedestrian, vehicle, bicycle, or other object) that is within proximity of the autonomous vehicle. For instance, an autonomous vehicle can detect an object that is within the surrounding environment of the vehicle. The autonomous vehicle can predict a trajectory by which the object is to travel over a certain time period (e.g., a ten second time period) that includes a plurality of time steps (e.g., one second time intervals). At each time step, the autonomous vehicle can determine if the object is (or is not) blocking the path of the autonomous vehicle based at least in part on the predicted trajectory of the object. The autonomous vehicle can determine a vehicle action sequence based at least in part on the blocking information and other data (e.g., vehicle motion parameters, map data, object state data, etc.). The vehicle action sequence can be indicative of a discrete vehicle action at each respective time step. A vehicle action can be indicative of whether the autonomous vehicle should, for example, stay ahead of the object (e.g., pass, maintain lead distance, etc.), stay behind the object (e.g., queue, stop, etc.), and/or ignore that object during that time step. The autonomous vehicle can utilize the vehicle action sequence to plan its motion and autonomously navigate through its environment. The autonomous vehicle can continue this process with other objects as the vehicle travels along its desired route. In this way, the autonomous vehicle can use this iterative optimization process to more accurately plan and control its motion with respect to surrounding objects on a more granular level (e.g., based on time steps), while also increasing vehicle, passenger, and object safety.

More particularly, an autonomous vehicle can be a ground-based autonomous vehicle (e.g., car, truck, bus, etc.) or another type of vehicle (e.g., aerial vehicle) that can operate with minimal and/or no interaction from a human operator. The autonomous vehicle can include a vehicle computing system located onboard the autonomous vehicle to help control the autonomous vehicle. The vehicle computing system can be located onboard the autonomous vehicle, in that the vehicle computing system can be located on or within the autonomous vehicle. The vehicle computing system can include one or more sensors (e.g., cameras, Light Detection and Ranging (LIDAR), Radio Detection and Ranging (RADAR), etc.), an autonomy computing system (e.g., for determining autonomous navigation), one or more vehicle control systems (e.g., for controlling braking, steering, powertrain), etc. The sensor(s) can gather sensor data (e.g., image data, RADAR data, LIDAR data, etc.) associated with the surrounding environment of the vehicle. For example, the sensor data can include LIDAR point cloud(s) and/or other data associated with one or more object(s) that are proximate to the autonomous vehicle (e.g., within a field of view of the sensor(s)) and/or one or more geographic characteristics of the geographic area (e.g., curbs, lane markings, sidewalks, etc.). The object(s) can include, for example, other vehicles, pedestrians, bicycles, etc. The object(s) can be static (e.g., not in motion) or dynamic (e.g., actors in motion). The sensor data can be indicative of characteristics (e.g., locations) associated with the object(s) at one or more times. The sensor(s) can provide such sensor data to the vehicle's autonomy computing system.

In addition to the sensor data, the autonomy computing system can obtain other types of data associated with the surrounding environment in which the objects (and/or the autonomous vehicle) are located. For example, the autonomy computing system can obtain map data that provides detailed information about the surrounding environment of the autonomous vehicle. The map data can provide information regarding: the identity and location of different roadways, road segments, buildings, sidewalks, or other items; the location and directions of traffic lanes (e.g., the boundaries, location, direction, etc. of a parking lane, a turning lane, a bicycle lane, or other lanes within a particular travel way); traffic control data (e.g., the location and instructions of signage, traffic lights, laws/rules, or other traffic control devices); the location of obstructions (e.g., roadwork, accident, etc.); data indicative of events (e.g., scheduled concerts, parades, etc.); and/or any other map data that provides information that assists the vehicle computing system in comprehending and perceiving its surrounding environment and its relationship thereto.

The autonomy computing system can be a computing system that includes various sub-systems that cooperate to perceive the surrounding environment of the autonomous vehicle and determine a motion plan for controlling the motion of the autonomous vehicle. For example, the autonomy computing system can include a perception system, a prediction system, and a motion planning system.

The perception system can be configured to perceive one or more objects within the surrounding environment of the autonomous vehicle. For instance, the perception system can process the sensor data from the sensor(s) to detect the one or more objects that are proximate to the autonomous vehicle as well as state data associated therewith. The state data can be indicative of one or more states (e.g., current or past state(s)) of one or more objects that are within the surrounding environment of the autonomous vehicle. For example, the state data for each object can describe (e.g., at a given time, time period, etc.) an estimate of the object's current and/or past location (also referred to as position), current and/or past speed/velocity, current and/or past acceleration, current and/or past heading, current and/or past orientation, size/footprint, class (e.g., vehicle class vs. pedestrian class vs. bicycle class), the uncertainties associated therewith, and/or other state information.

The prediction system can be configured to predict a motion of the object(s) within the surrounding environment of the autonomous vehicle. For instance, the prediction system can create prediction data associated with the one or more objects based on the state data. The prediction data can be indicative of one or more predicted future locations of each respective object. For example, the prediction system can determine a predicted trajectory of an object. The predicted trajectory can be indicative of a predicted path that the object is predicted to travel over time and the timing associated therewith. The prediction data can also be indicative of the speed at which the object is predicted to travel along the predicted trajectory.

The motion planning system can determine a motion plan for the autonomous vehicle based at least in part on the predicted data (and/or other data). The motion plan can include vehicle actions with respect to the objects within the surrounding environment of the autonomous vehicle as well as the predicted movements. For instance, the motion planning system can implement an optimization planner that includes an optimization algorithm, which considers cost data associated with a vehicle action as well as other objective functions (e.g., cost functions based on speed limits, traffic lights, etc.), if any, to determine optimized variables that make up the motion plan. By way of example, the motion planning system can determine that the vehicle can perform a certain action (e.g., pass an object, etc.) without increasing the potential risk to the vehicle and/or violating any traffic laws (e.g., speed limits, lane boundaries, signage, etc.). A motion plan can include a planned motion trajectory of the autonomous vehicle. The planned motion trajectory can be indicative of a trajectory that the autonomous vehicle is to follow for a particular time period. The motion plan can also indicate speed(s), acceleration(s), and/or other operating parameters/actions of the autonomous vehicle.

The motion planning system can be configured to continuously update the vehicle's motion plan and the corresponding planned motion trajectory. For example, in some implementations, the motion planning system can generate new motion plan(s) for each motion planning cycle. Each new motion plan can describe motion of the vehicle over the next several seconds (e.g., 5 seconds). Moreover, a new motion plan may include a new planned motion trajectory. Thus, in some implementations, the motion planning system can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the autonomous vehicle.

The systems and methods of the present disclosure improve the ability of the vehicle computing system (e.g., the motion planning system) to control the motion of the autonomous vehicle by determining a plurality of vehicle actions for a given object during each motion planning cycle. To help do so, the vehicle computing system (e.g., the motion planning system) can obtain data associated with an object within the surrounding environment of an autonomous vehicle. This data can include, for example, the predicted motion trajectory of the object. As described herein, the predicted motion trajectory can include a path that an object is predicted to follow over a certain time period (e.g., a ten second planning horizon). In some implementations, the predicted motion trajectory can be indicative of the predicted states (e.g., locations, heading, speed, etc.) of the object at one or more future times. In some implementations, the data associated with the object can include map data associated with a geographic area in which the object is (or will be) located.

In some implementations, the vehicle computing system can obtain data indicative of one or more features associated with an object. For instance, the vehicle computing system can determine one or more feature(s) associated with an object based at least in part on the state data. In some implementations, the vehicle computing system can determine the feature(s) based at least in part on other information, such as the acquired map data. The feature(s) can be indicative of the movement (or lack thereof) and/or position of the object relative to one or more items within the vehicle's surroundings, the autonomous vehicle, and/or other information associated with the object. For example, the feature(s) can include a location of the object relative to a travel way (e.g., relative to the left or right lane markings, curbs, etc.), a location of the object relative to the autonomous vehicle (e.g., a distance between the location of the vehicle and the object), one or more characteristic(s) of the object relative to a planned vehicle trajectory and/or route associated with the autonomous vehicle (e.g., whether the object is moving parallel, towards, or away from the vehicle's current/future motion trajectory/travel route or a predicted point of intersection with the vehicle), etc. In some implementations, the feature(s) determined for a particular object may depend at least in part on the class of that object. For example, the predicted path for a vehicle or bicycle traveling on a roadway may be different than that associated with a pedestrian traveling on a sidewalk.

The vehicle computing system (e.g., the motion planning system) can determine a vehicle action sequence for the autonomous vehicle based at least in part on the data associated with the object. This can be done using a two-tiered approach. First, the vehicle computing system can determine, for each time step whether the object is blocking or not blocking the autonomous vehicle based at least in part on the predicted motion trajectory of the object, as further described herein. Then, the vehicle computing system can determine a respective vehicle action for the autonomous vehicle at each of the respective time steps based at least in part on whether the object is blocking or not blocking the autonomous vehicle at the respective time step. This two-tiered approach can be implemented by using a plurality of model(s).

For instance, the vehicle computing system can include, employ, and/or otherwise leverage a blocking model configured to determine whether an object within the surrounding environment of the autonomous vehicle is blocking or not blocking the autonomous vehicle. To do so, the vehicle computing system can evaluate the predicted motion trajectory of the object as well as the planned motion trajectory of the vehicle (e.g., the latest planned motion trajectory indicative of the current/future motion of the vehicle). In some implementations, an object can be considered blocking in the event the object is predicted to be located within the planned motion trajectory of the autonomous vehicle (e.g., with distance buffers on either side of the trajectory) and/or within a travel lane of the autonomous vehicle. For example, a blocking object at time T can be determined from its predicted location at that time and how the object will be positioned with respect to the future predicted trajectory of the autonomous vehicle.

In some implementations, the blocking model can include a rule(s)-based algorithm configured to determine whether or not an object is blocking the autonomous vehicle. For example, the rule(s)-based model can include heuristics that can be utilized to determine whether an object is blocking the autonomous vehicle. Such heuristics can be developed based on real-world driving log data that is indicative of objects that are considered to be blocking or not blocking a vehicle.

In some implementations, the blocking model can include a machine-learned model (e.g., a machine-learned blocking model). The machine-learned blocking model can be or can otherwise include one or more various model(s) such as, for example, models utilizing boosted random forest techniques, support vector machines, neural networks (e.g., deep neural networks), or other multi-layer non-linear models. Neural networks can include convolutional neural networks, recurrent neural networks (e.g., long short-term memory recurrent neural networks), feed-forward neural networks, and/or other forms of neural networks. For instance, supervised training techniques can be performed to train the machine-learned blocking model to determine whether an object is blocking or is not blocking an autonomous vehicle. Such training data can be based on labelled driving log data acquired by vehicles driven in the real-world. The training data can be human-labeled and/or machine labelled to indicate that a training object is blocking or is not blocking at a particular time (e.g., time step). In some implementations, the training data can be used to train a machine-learned blocking model offline.

The vehicle computing system (e.g., the motion planning system) can input data into the blocking model and receive an output. For instance, the vehicle computing system (e.g., the motion planning system) can obtain data indicative of the blocking model from an accessible memory onboard the autonomous vehicle and/or from a memory that is remote from the vehicle (e.g., via a wireless network). The vehicle computing system can input the predicted motion trajectory of the object into the blocking model. In some implementations, the vehicle computing system can input other data into the blocking model such as, for example, map data, data associated with the autonomous vehicle, etc. The blocking model can process the data to determine whether the object is blocking or is not blocking the autonomous vehicle at each respective time step of the predicted trajectory. For instance, at each time step, the blocking model can determine if the object is blocking the autonomous vehicle based on the predicted position of that object within a travel lane, relative to the vehicle's planned path, etc. By way of example, a pedestrian can be considered to not be blocking an autonomous vehicle at a first time step in the event that the pedestrian is located on the sidewalk, out of the street. The pedestrian can be considered to be blocking the autonomous vehicle at a second time step in the event that the pedestrian is located ahead of the vehicle and in the travel lane in which the autonomous vehicle is traveling. The vehicle computing system can receive an output from the blocking model. The output can include data indicative of the whether the object is blocking or not blocking the autonomous vehicle at each of the respective time steps. Such data can include, for example, a series of blocking decisions at each time step (e.g., one second interval, etc.) of the time period (e.g., ten second time period, etc.) associated with the predicted trajectory of the object. The time steps can be fixed (e.g., one second fixed intervals) and/or varied. Moreover, the time steps can be sampled at a fixed resolution or a varied resolution (e.g., more sampling at the start of a predicted motion trajectory).

To determine a vehicle action at each respective time step, the vehicle computing system can include, employ, and/or otherwise leverage a vehicle action model. The vehicle action model can be a machine-learned model configured to determine a plurality of vehicle actions for the autonomous vehicle. In particular, the machine-learned vehicle action model can be configured to determine, at each respective time step, a vehicle action for the autonomous vehicle with respect to the object. A vehicle action can include a recommended motion for the vehicle in light of the predicted location of the object. The vehicle action(s) can be determined from a set of predefined vehicle actions including, for example, pass, queue, stay behind, stay ahead, follow, lead, ignore, etc. The vehicle actions can vary from one time step to the next within a vehicle action sequence. This opportunity for variability within a certain time period can help provide a more dynamically determined aspect of motion planning when compared with a vehicle action that is static or fixed during the same time period.

The machine-learned vehicle action model can be or can otherwise include one or more various model(s) such as, for example, models utilizing boosted random forest techniques, support vector machines, neural networks (e.g., deep neural networks), or other multi-layer non-linear models. Neural networks can include convolutional neural networks, recurrent neural networks (e.g., long short-term memory recurrent neural networks), feed-forward neural networks, and/or other forms of neural networks.

Training techniques can be performed to train the machine-learned vehicle action model to determine a vehicle action with respect to an object. For example, the machine-learned vehicle action can be trained using supervised training techniques based on training data. The training data can include labelled driving log data. The labelled driving log data can include a first set of labels and a second set of labels. The first set of labels can be indicative of whether a training object is considered to be blocking or not blocking at a plurality of respective training time steps. In some implementations, the first set of labels can be human-labelled, as described herein. In some implementations, outputs from the blocking model (e.g., a series of blocking decisions, etc.) can be utilized as training data for the vehicle action model to determine a vehicle action given the blocking state of the object. The second set of labels can indicate an appropriate training vehicle action at each of the respective training time steps. The second set of labels can be human-labelled and/or automatically labelled. These labels can be utilized as ground-truth data to determine the accuracy and/or development of the vehicle action model as it is trained.

The vehicle computing system (e.g., the motion planning system) can provide input data into the vehicle action model and receive an output. For instance, the vehicle computing system (e.g., the motion planning system) can obtain data indicative of the vehicle action model from an accessible memory onboard the autonomous vehicle and/or from a memory that is remote from the vehicle (e.g., via a wireless network). The vehicle computing system can provide input data into the vehicle action model. The input data can include, for example, the data indicative of the whether the object is blocking or not blocking the autonomous vehicle at each of the respective time steps (e.g., the output of the blocking model), data associated with the autonomous vehicle (e.g., heading, speed, acceleration, trajectory, etc.), one or more features associated with the object (as described herein), data indicative of the predicted trajectory of the object within the surrounding environment, and/or other data. The vehicle action model can process the data to determine a vehicle action at each respective time step of the predicted trajectory. For instance, at each time step, the vehicle action model can determine that the vehicle should pass the object or queue behind the object. By way of example, the vehicle action model can determine that the autonomous vehicle can pass a pedestrian that is not blocking the autonomous vehicle (e.g., is located on the sidewalk, out of the street). In the event that a pedestrian blocks the future route/path of the autonomous vehicle at a distance D at some time T, the vehicle action model can determine whether or not the autonomous vehicle can pass the pedestrian within the distance D before time T with sufficient clearance. If so, the vehicle action model can determine that the autonomous vehicle should pass and/or stay ahead of the pedestrian (e.g., at that particular time). If not, the vehicle action model can determine that the autonomous vehicle should queue behind the pedestrian (e.g., decelerate, stop, etc.). The vehicle computing system can receive an output from the vehicle action model. The output can include data indicative of a vehicle action sequence. The vehicle action sequence can be indicative of a plurality of vehicle actions for the autonomous vehicle at a plurality of time steps. More particularly, the vehicle action sequence can include the discrete vehicle action decided for each respective time step of the predicted object trajectory.

The vehicle computing system can determine a motion of the autonomous vehicle based at least in part on the vehicle action sequence. For instance, the motion planning system can generate cost data indicative of an effect of performing the respective vehicle action for each time step. The cost data can include a cost function indicative of a cost (e.g., over time) of controlling the motion of the autonomous vehicle (e.g., the trajectory, speed, or other controllable parameters of the autonomous vehicle) to perform the respective vehicle action (e.g., pass, queue behind, ignore, etc.). The autonomy computing system can determine a motion plan for the autonomous vehicle based at least in part on the cost data. For example, an optimizer can consider the cost data associated with the respective vehicle actions of the vehicle action sequence as well as other cost functions to determine optimized variables that make up the motion plan. For example, based on the vehicle action sequences, objects can be determined as leading_actors, trailing_actors, and/or pass_actors. The motion planning system can generate fences for each of the objects (e.g., ACC fences for leading_actors and push fences for trailing_actors). The motion planning system can determine a planned motion trajectory for the vehicle to follow based at least in part on these fences.

The vehicle computing system can cause the autonomous vehicle to initiate travel in accordance with at least a portion of the motion plan. For example, the motion plan can include a trajectory by which the autonomous vehicle is to pass the object with at least a passing distance margin between the autonomous vehicle and the object. Moreover, the motion plan can modulate the speed of the autonomous vehicle such that the autonomous vehicle queues behind and/or stops at a particular distance from the object. The motion plan can be provided to a vehicle controller that is configured to implement the motion plan. For example, the vehicle controller can translate the motion plan into instructions for the vehicle control system (e.g., acceleration control, brake control, steering control, etc.).

The systems, methods, and vehicles described herein may provide a number of technical effects and benefits. For instance, the vehicle computing system can locally (e.g., on-board the vehicle) detect an object, evaluate its position relative to the autonomous vehicle (e.g., whether the object is blocking vs. not blocking), and adjust the motion of the vehicle accordingly. This can be done at various time intervals for a predicted object motion trajectory. By providing a temporal resolution for evaluating an object's position relative to an autonomous vehicle (e.g., in determining whether an object is blocking vs. not blocking at multiple time steps and/or in determining a corresponding vehicle action sequence), a more dynamic and accurate representation of objects can be provided for improved vehicle motion planning. The vehicle computing system can be configured to continuously perform this iterative optimization process as the vehicle travels and different objects become proximate to the autonomous vehicle. As such, the vehicle computing system can proactively control the motion of the autonomous vehicle on a more granular level to avoid sudden movements that place stress on the vehicle's systems and confuse or frighten users (e.g., passengers of the vehicle). Moreover, the autonomous vehicle can operate in a manner that is safer for the objects in the vehicle's surroundings and for the vehicle itself.

The disclosed systems, methods and vehicles have a technical effect and benefit of improved scalability by using a machine-learned model to determine vehicle action sequences relative to detected objects. Moreover, the disclosed systems, methods and vehicles have an additional technical effect and benefit of improved adaptability and opportunity to realize improvements in related autonomy systems by using a machine-learned vehicle action model to determine vehicle action sequences relative to detected objects. An autonomy system can include numerous different components (e.g., perception, prediction, optimization, etc.) that jointly operate to determine a vehicle's motion plan. As technology improvements to one component are introduced, the machine-learned vehicle action model can capitalize on those improvements to create a further refined and more accurate determination of vehicle actions relative to objects, for example, by simply retraining the existing model on new training data captured by the improved autonomy components.

The systems, methods, and vehicles described herein also provide an improvement to vehicle computing technology, such as autonomous vehicle computing technology. For instance, aspects of the present disclosure enable a computing system (e.g., a vehicle computing system) to more efficiently and accurately control the vehicle's motion. For example, a computing system can obtain data associated with an object within the surrounding environment of an autonomous vehicle (e.g., data indicative of a predicted motion trajectory of the object). The computing system can determine, at each respective time step of a plurality of time steps, whether the object is blocking or not blocking the autonomous vehicle based at least in part on the predicted motion trajectory of the object. The computing system can determine a vehicle action sequence for the autonomous vehicle based at least in part on data indicative of whether the object is blocking or not blocking a path of the autonomous vehicle at each respective time step. Moreover, the computing system can determine a motion of the autonomous vehicle based at least in part on the vehicle action sequence. By determining a vehicle action sequence for a predicted trajectory of an object (e.g., rather than a single vehicle action for the entire predicted trajectory), the computing system can more accurately plan the motion of the autonomous vehicle with respect to what is occurring in the surrounding environment of the vehicle. For example, the vehicle computing system can determine that the vehicle can pass an object that is no longer blocking the autonomous vehicle during the later portion of the object's predicted trajectory. This can increase the efficiency of the autonomous vehicle, while also decreasing the strain on the vehicle's control systems by reducing the amount of decelerating/accelerating performed by the vehicle.

With reference now to the FIGS., example embodiments of the present disclosure will be discussed in further detail. FIG. 1 illustrates an example system 100 according to example embodiments of the present disclosure. The system 100 can include a vehicle computing system 102 associated with a vehicle 104. In some implementations, the system 100 can include an operations computing system 106 that is remote from the vehicle 104.

In some implementations, the vehicle 104 can be associated with an entity (e.g., a service provider, owner, manager). The entity can be one that offers one or more vehicle service(s) to a plurality of users 105 via a fleet of vehicles that includes, for example, the vehicle 104. In some implementations, the entity can be associated with only vehicle 104 (e.g., a sole owner, manager). In some implementations, the operations computing system 106 can be associated with the entity. The vehicle 104 can be configured to provide one or more vehicle services to one or more users. The vehicle service(s) can include transportation services (e.g., rideshare services in which user rides in the vehicle 104 to be transported), courier services, delivery services, and/or other types of services. The vehicle service(s) can be offered to users by the entity, for example, via a software application (e.g., a mobile phone software application). The entity can utilize the operations computing system 106 to coordinate and/or manage the vehicle 104 (and its associated fleet, if any) to provide the vehicle services to a user.

The operations computing system 106 can include one or more computing devices that are remote from the vehicle 104 (e.g., located off-board the vehicle 104). For example, such computing device(s) can be components of a cloud-based server system and/or other type of computing system that can communicate with the vehicle computing system 102 of the vehicle 104 (and/or a user device). The computing device(s) of the operations computing system 106 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system 106 (e.g., the one or more processors, etc.) to perform operations and functions, such as providing data to and/or receiving data from the vehicle 104, for managing a fleet of vehicles (that includes the vehicle 104), etc.

The vehicle 104 incorporating the vehicle computing system 102 can be a ground-based autonomous vehicle (e.g., car, truck, bus, etc.), an air-based autonomous vehicle (e.g., airplane, helicopter, or other aircraft), or other types of vehicles (e.g., watercraft, etc.). The vehicle 104 can be an autonomous vehicle that can drive, navigate, operate, etc. with minimal and/or no interaction from a human operator (e.g., driver). In some implementations, a human operator can be omitted from the vehicle 104 (and/or also omitted from remote control of the vehicle 104). In some implementations, a human operator can be included in the vehicle 104.

In some implementations, the vehicle 104 can be configured to operate in a plurality of operating modes. The vehicle 104 can be configured to operate in a fully autonomous (e.g., self-driving) operating mode in which the vehicle 104 is controllable without user input (e.g., can drive and navigate with no input from a human operator present in the vehicle 104 and/or remote from the vehicle 104). The vehicle 104 can operate in a semi-autonomous operating mode in which the vehicle 104 can operate with some input from a human operator present in the vehicle 104 (and/or remote from the vehicle 104). The vehicle 104 can enter into a manual operating mode in which the vehicle 104 is fully controllable by a human operator (e.g., human driver, pilot, etc.) and can be prohibited from performing autonomous navigation (e.g., autonomous driving). In some implementations, the vehicle 104 can implement vehicle operating assistance technology (e.g., collision mitigation system, power assist steering, etc.) while in the manual operating mode to help assist the human operator of the vehicle 104.

The operating modes of the vehicle 104 can be stored in a memory onboard the vehicle 104. For example, the operating modes can be defined by an operating mode data structure (e.g., rule, list, table, etc.) that indicates one or more operating parameters for the vehicle 104, while in the particular operating mode. For example, an operating mode data structure can indicate that the vehicle 104 is to autonomously plan its motion when in the fully autonomous operating mode. The vehicle computing system 102 can access the memory when implementing an operating mode.

The operating mode of the vehicle 104 can be adjusted in a variety of manners. In some implementations, the operating mode of the vehicle 104 can be selected remotely, off-board the vehicle 104. For example, an entity associated with the vehicle 104 (e.g., a service provider) can utilize the operations computing system 106 to manage the vehicle 104 (and/or an associated fleet). The operations computing system 106 can send data to the vehicle 104 instructing the vehicle 104 to enter into, exit from, maintain, etc. an operating mode. By way of example, the operations computing system 106 can send data to the vehicle 104 instructing the vehicle 104 to enter into the fully autonomous operating mode. In some implementations, the operating mode of the vehicle 104 can be set onboard and/or near the vehicle 104. For example, the vehicle computing system 102 can automatically determine when and where the vehicle 104 is to enter, change, maintain, etc. a particular operating mode (e.g., without user input). Additionally, or alternatively, the operating mode of the vehicle 104 can be manually selected via one or more interfaces located onboard the vehicle 104 (e.g., key switch, button, etc.) and/or associated with a computing device proximate to the vehicle 104 (e.g., a tablet operated by authorized personnel located near the vehicle 104). In some implementations, the operating mode of the vehicle 104 can be adjusted based at least in part on a sequence of interfaces located on the vehicle 104. For example, the operating mode may be adjusted by manipulating a series of interfaces in a particular order to cause the vehicle 104 to enter into a particular operating mode.

The vehicle computing system 102 can include one or more computing devices located onboard the vehicle 104. For example, the computing device(s) can be located on and/or within the vehicle 104. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 104 (e.g., its computing system, one or more processors, etc.) to perform operations and functions, such as those described herein for controlling vehicle motion, etc.

The vehicle 104 can include a communications system 108 configured to allow the vehicle computing system 102 (and its computing device(s)) to communicate with other computing devices. The vehicle computing system 102 can use the communications system 108 to communicate with the operations computing system 106 and/or one or more other computing device(s) over one or more networks (e.g., via one or more wireless signal connections). In some implementations, the communications system 108 can allow communication among one or more of the system(s) onboard the vehicle 104. The communications system 108 can include any suitable components for interfacing with one or more network(s), including, for example, transmitters, receivers, ports, controllers, antennas, and/or other suitable components that can help facilitate communication.

As shown in FIG. 1, the vehicle 104 can include one or more vehicle sensors 112, an autonomy computing system 114, one or more vehicle control systems 116, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 112 can be configured to acquire sensor data 118 associated with one or more objects that are within the surrounding environment of the vehicle 104 (e.g., within a field of view of one or more of the vehicle sensor(s) 112). The vehicle sensor(s) 112 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 118 can include image data, radar data, LIDAR data, and/or other data acquired by the vehicle sensor(s) 112. The object(s) can include, for example, pedestrians, vehicles, bicycles, and/or other objects. The object(s) can be located in front of, to the rear of, to the side of the vehicle 104, etc. The sensor data 118 can be indicative of locations associated with the object(s) within the surrounding environment of the vehicle 104 at one or more times. The vehicle sensor(s) 112 can provide the sensor data 118 to the autonomy computing system 114.

In addition to the sensor data 118, the autonomy computing system 114 can retrieve or otherwise obtain map data 120. The map data 120 can provide detailed information about the surrounding environment of the vehicle 104. For example, the map data 120 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., intended flow directions, the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 104 in comprehending and perceiving its surrounding environment and its relationship thereto. In some implementations, the vehicle computing system 102 can determine a vehicle route for the vehicle 104 based at least in part on the map data 120.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to a remote computing device (e.g., of the operations computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the vehicle sensor data 118 (e.g., LIDAR data, camera data) to match it to a map of the surrounding environment to get an understanding of the vehicle's position within that environment.

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the sensor data 118 from the vehicle sensor(s) 112, attempt to comprehend the surrounding environment by performing various processing techniques on the sensor data 118 (and/or other data), and generate an appropriate motion plan through such surrounding environment. The autonomy computing system 114 can control the one or more vehicle control systems 116 to operate the vehicle 104 according to the motion plan.

The vehicle computing system 102 (e.g., the perception system 124) can identify one or more objects within the surrounding environment of the vehicle 104 based at least in part on the sensor data 118 and/or the map data 120. For example, the vehicle computing system 102 can process the sensor data 118, the map data 120, etc. to obtain state data 130. The vehicle computing system 102 can obtain state data 130 that is indicative of one or more states (e.g., current and/or past state(s)) of one or more objects that are within a surrounding environment of the vehicle 104. For example, the state data 130 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 124 can provide the state data 130 to the prediction system 126.

The prediction system 126 can be configured to predict a motion of the object(s) within the surrounding environment of the vehicle 104. For instance, the prediction system 126 can create prediction data 132 associated with the one or more the objects based at least in part on the state data 130. The prediction data 132 can be indicative of one or more predicted future locations of each respective object. For example, the prediction system 126 can determine a predicted trajectory of an object. The predicted trajectory can be indicative of a predicted path that the object is predicted to travel over time and the timing associated therewith. The prediction data 132 can also be indicative of the speed at which the object is predicted to travel along the predicted trajectory.

The vehicle computing system 102 (e.g., the motion planning system 128) can determine a motion plan 134 for the vehicle 104 based at least in part on the predicted data 132, the state data 130, and/or other data. The motion plan 134 can include one or more vehicle actions with respect to the objects within the surrounding environment of the vehicle 104 as well as the predicted movements. For instance, the motion planning system 128 can implement an optimizer (e.g., an optimization planner) that includes an optimization algorithm, which considers cost data associated with a vehicle action as well as other objective functions (e.g., cost functions based on speed limits, traffic lights, etc.), if any, to determine optimized variables that make up the motion plan. By way of example, the motion planning system 128 can determine that the vehicle 104 can perform a certain action (e.g., pass an object, etc.) without increasing the potential risk to the vehicle and/or violating any traffic laws (e.g., speed limits, lane boundaries, signage, etc.). A motion plan 134 can include a planned motion trajectory of the vehicle 104. The planned motion trajectory can be indicative of a trajectory that the vehicle 104 is to follow for a particular time period. The motion plan 134 can also indicate speed(s), acceleration(s), and/or other operating parameters/actions of the vehicle 104.

The vehicle computing system 102 (e.g., the motion planning system 128) can be configured to continuously update the vehicle's motion plan and the corresponding planned motion trajectory. For example, in some implementations, the motion planning system 128 can generate new motion plan(s) for each motion planning cycle. Each new motion plan can describe motion of the vehicle 104 over a subsequent time period (e.g., the next several seconds, etc.). Moreover, a new motion plan may include a new planned motion trajectory of the vehicle 104. Thus, in some implementations, the vehicle computing system 102 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 104.

The vehicle computing system 102 (e.g., the motion planning system 128) can be configured control the motion of the vehicle 104 by determining a plurality of vehicle actions for a given object during each motion planning cycle. To help do so, the vehicle computing system 102 can obtain data associated with an object within the surrounding environment of the vehicle 104. This data can include the predicted motion trajectory of the object (e.g., indicated by the prediction data 132). As described herein, the predicted motion trajectory can include a path that the object is predicted to follow over a certain time period (e.g., a ten second planning horizon). The predicted motion trajectory can be associated with a plurality of time intervals and/or times. In some implementations, the predicted motion trajectory can be indicative of the predicted states (e.g., locations, heading, speed, etc.) of the object at one or more times. In some implementations, the data associated with the object can include map data 120 associated with a geographic area in which the object is (or will be) located.

In some implementations, the vehicle computing system 102 can obtain data indicative of one or more features associated with an object. For instance, the vehicle computing system 102 can determine one or more feature(s) associated with an object based at least in part on the state data 130. In some implementations, the vehicle computing system 102 can determine the feature(s) based at least in part on other information, such as the acquired map data 120. The feature(s) can be indicative of the movement (or lack thereof) and/or position of the object relative to one or more items within the vehicle's surroundings, the vehicle 104, and/or other information associated with the object. For example, the feature(s) can include a location of the object relative to a travel way (e.g., relative to the left or right lane markings, curbs, etc.), a location of the object relative to the vehicle 104 (e.g., a distance between the location of the vehicle 104 and the object), one or more characteristic(s) of the object relative to a planned vehicle trajectory and/or route associated with the vehicle 104 (e.g., whether the object is moving parallel, towards, or away from the vehicle's current/future motion trajectory/travel route or a predicted point of intersection with the vehicle), etc. In some implementations, the feature(s) determined for a particular object may depend at least in part on the class of that object. For example, the predicted path for a vehicle or bicycle traveling on a roadway may be different than that associated with a pedestrian traveling on a sidewalk.

The vehicle computing system 102 (e.g., the motion planning system 128) can determine a vehicle action sequence for the vehicle 104 based at least in part on the data associated with the object. This can be done using a two-tiered approach. For example, the vehicle computing system 102 can determine, at each respective time step (of a plurality of time steps) whether the object is blocking or not blocking the vehicle 104 based at least in part on the predicted motion trajectory of the object. The vehicle computing system 102 can determine a vehicle action sequence for the vehicle based 104 at least in part on data indicative of whether the object is blocking or not blocking the vehicle 104 at a particular time. A time step can be indicative of a point in time, a time interval (e.g., indicative of a set of times in time), etc. along the predicted motion trajectory of the object. The vehicle computing system 102 can determine a respective vehicle action for the vehicle 102 at each of the respective time steps based at least in part on whether the object is blocking or not blocking the vehicle 102 at the respective time step. This two-tiered approach can be implemented by using a plurality of model(s).

The vehicle computing system 102 can determine that an object is blocking or not blocking the vehicle 104 at a particular time (along the object's predicted path) based at least in part on a first model. For instance, the vehicle computing system 102 can include, employ, and/or otherwise leverage a blocking model 136. The blocking model 136 can be configured to determine whether an object within a surrounding environment of the vehicle 104 is blocking or not blocking the vehicle 104. In some implementations, an object can be considered blocking in the event the object is predicted to be located within the planned motion trajectory of the vehicle 104 (e.g., with distance buffers on either side of the trajectory) and/or within a travel lane of the vehicle 104 at a particular time (e.g., time step). For example, an object can be considered to be blocking in the event that an object has a longitudinal distance D (e.g., distance along the vehicle nominal path) and the future route of the vehicle 104 approaches and/or overlaps with such position (e.g., regardless of where the vehicle 104 is laterally with respect to the object or nominal path). In some implementations, the determination as to whether an object is blocking or is not blocking the vehicle 104 at a particular time can be based at least in part on the geometry of the scene at that time step. For instance, if the vehicle 104 does not and/or will not physically have enough room (e.g., with an approach buffer distance) to pass the object (e.g., in lane, without breaking traffic rules, etc.), the object can be considered blocking. In some implementations, the determination as to whether an object is blocking or is not blocking the vehicle 104 can be based at least in part on the context of the scene at that time step such as, for example, the type of object under consideration. For instance, a pedestrian may be considered blocking if the pedestrian is simply located within the same travel way and/or lane as the vehicle 104, regardless of whether the vehicle 104 has enough space to physically pass the pedestrian.

In some implementations, the blocking model 136 can include a rule(s)-based algorithm configured to determine whether an object is blocking or is not blocking the vehicle 104 at a particular time (e.g., time step). For example, the rule(s)-based model can include heuristics that can be utilized to determine whether an object is blocking the vehicle 104. Such heuristics can be developed based on real-world driving log data that is indicative of objects that are considered to be blocking or that are considered to not be blocking a vehicle.

In some implementations, the blocking model 136 can be and/or can otherwise include a machine-learned model (e.g., a machine-learned blocking model). The machine-learned blocking model can be or can otherwise include one or more various model(s) such as, for example, models utilizing boosted random forest techniques, support vector machines, neural networks (e.g., deep neural networks), or other multi-layer non-linear models. Neural networks can include convolutional neural networks, recurrent neural networks (e.g., long short-term memory recurrent neural networks), feed-forward neural networks, and/or other forms of neural networks.

Figure 2A:
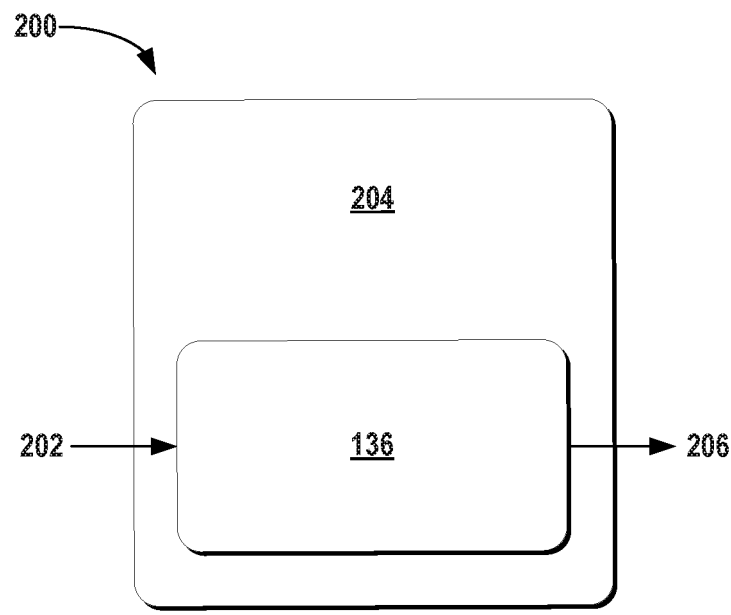
FIGS. 2A-B depict diagrams of example model training according to example embodiments of the present disclosure.

The blocking model 136 can be trained determine whether an object, at a particular time, is blocking or is not blocking a vehicle. For example, FIG. 2A depicts a diagram 200 of example model training according to example embodiments of the present disclosure. The blocking model 136 (e.g., a machine-learned blocking model) can be trained based on a set of training data 202. For instance, training techniques (e.g., supervised training techniques, etc.) can be performed to train the blocking model 136 to determine whether an object is blocking or is not blocking a vehicle 104. The training data 202 can include labelled driving log data acquired by vehicles driven in the real-world. The training data 202 can be human-labeled and/or machine labelled to indicate that a training object is blocking or is not blocking at a particular time. In some implementations, the training data 202 can be used to train the blocking model 136 offline.

Figure 3:
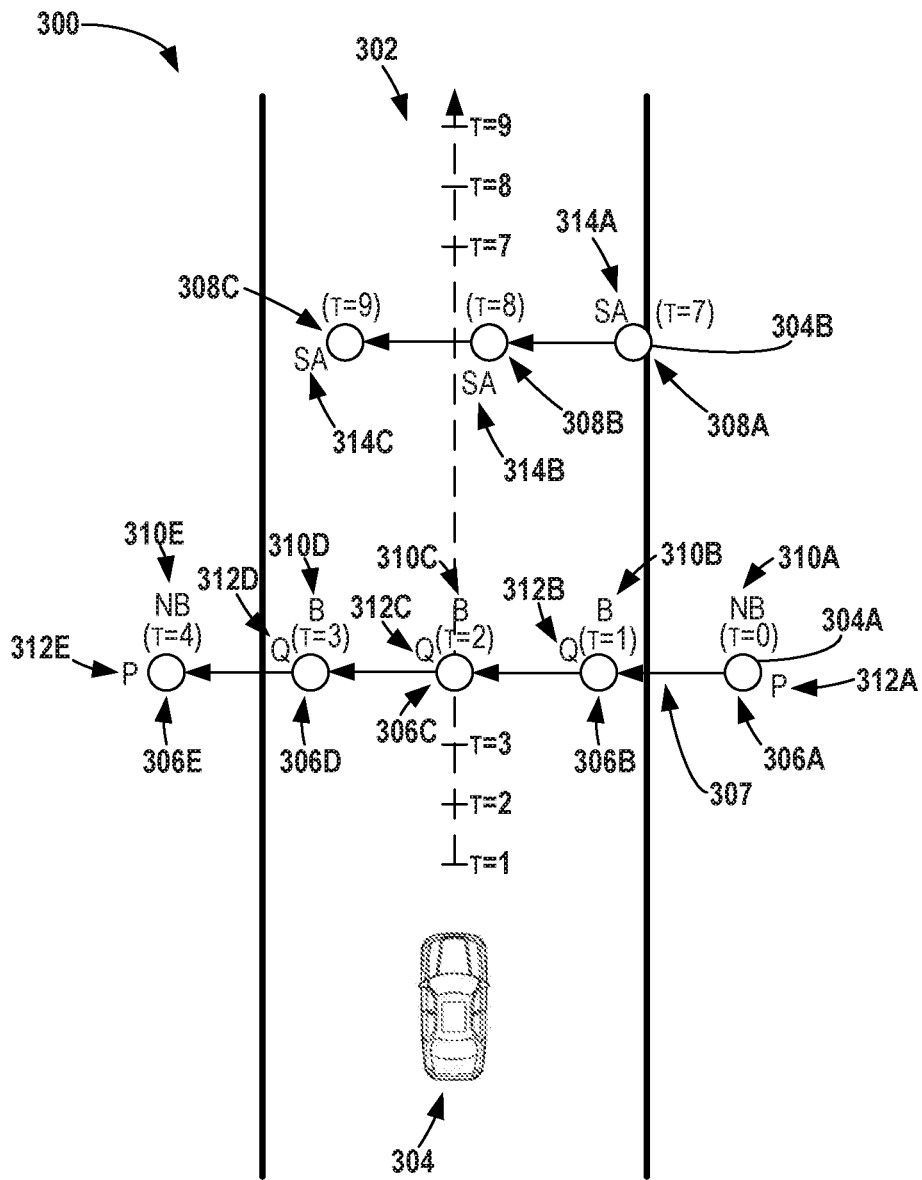
FIG. 3 depicts a diagram of example training data labelling according to example embodiments of the present disclosure.

FIG. 3 depicts a diagram 300 of example training data labelling according to example embodiments of the present disclosure. The diagram 300 illustrates a travel way 302 on which a vehicle 304 was travelling. The vehicle 304 can be a human driven vehicle and/or an autonomous vehicle that acquires driving log data associated with the surrounding environment of the vehicle 304. For instance, the driving log data can be based at least in part on sensor data and/or other data acquired by the vehicle 304 (e.g., acquired by the sensor(s) associated with the vehicle 304 as the vehicle 304 travels). The driving log data can be indicative of one or more training objects 304A-B. For example, the driving log data can be indicative of the location(s) 306A-E of a first training object 304A at one or a plurality of times (e.g., T=0, 1, 2, 3, 4, . . . , etc.). These locations can be associated with a trajectory 307 of the first training object 304A (e.g., locations along the trajectory of the object). Additionally, or alternatively the driving log data can be indicative of location(s) 308A-C of a second training object 304B at one or a plurality of times (e.g., T=7, 8, 9, . . . , etc.).

The driving log data can be labelled to indicate whether the training object(s) 304A-B are blocking or are not blocking the vehicle 304. For instance, the labelled driving log data can include a first plurality of labels 310A-E (e.g., shown as "B" or "NB") that indicates whether the first training object 304A is considered to be blocking or not blocking at a plurality of respective time steps. Such labels can also indicate whether the first training object 304A is considered to be blocking or not blocking at a plurality of locations 306A-E associated with the trajectory 307. For example, the first set of labels can indicate that the first training object 304A is not blocking at T=0 and T=4 (e.g., at locations 306A and 306E when the pedestrian is out of the travel way) and that the first training object 304A is blocking at T=1-3 (e.g., at locations 306B-D when the pedestrian is in the travel way even if the vehicle 304 could physically pass the pedestrian).

In some implementations, the first set of labels 310A-E can be human-labelled by humans that review the driving log data (e.g., observe camera data indicative of the training object's position relative to the vehicle 304, travel way 302, etc.). In some implementations, the first set of labels 310A-E can be machine-labelled. For instance, a computing system can be configured to automatically label the driving log data (e.g., based on rule(s) and/or a model) with the first set of labels 310A-E to create labelled driving log data to be use in the training data 202.

Returning to FIG. 2A, a model trainer 204 can obtain the training data 202 from memory (e.g., training database). The training data 202 can include the labelled driving log as described, for example, with reference to FIG. 3. For example, the labelled driving log data can be indicative of a trajectory 307 of a training object (e.g., first training object 304A) and first set of labels (e.g., labels 310A-E). The model trainer 204 can train and/or build the blocking model 136 using the training data 202. The model trainer 204 can evaluate a training output 206 of the blocking model 136 to determine the accuracy and/or confidence level of the model as it is trained over time. The model trainer 204 can continue to train the blocking model 136 until a sufficient level of accuracy and/or confidence is achieved. Such training can help build and/or refine the blocking model 136 to more accurately reflect the whether an object is blocking or not blocking a vehicle. Moreover, this can help increase the likelihood that the vehicle computing system 102 will ultimately determine an appropriate vehicle action for that object at a particular time step.

Returning to FIG. 1, the vehicle computing system 102 (e.g., the motion planning system 128) can determine a vehicle action sequence for the vehicle 104 based at least in part on a second model. A vehicle action sequence can be indicative of plurality of vehicle actions for the vehicle 104 at a plurality of respective time steps associated with the predicted motion trajectory of an object. For instance, the vehicle computing system 102 can include, employ, and/or otherwise leverage a vehicle action model 138. The vehicle action model 138 can be configured to determine a plurality of vehicle actions for the vehicle 104. In particular, the vehicle action model 138 can be configured to determine, at each respective time step, a vehicle action for the vehicle 104 with respect to the object. Each of the respective time steps can be associated with a predicted motion trajectory of an object, as further described herein.

A respective vehicle action can be indicative of a suggested motion of the vehicle 104 with respect to the object. For example, the vehicle action(s) can be determined from a set of predefined vehicle actions. In some implementations, the vehicle action(s) can include one of passing the object, ignoring the object, or queuing behind the object. In some implementations, the vehicle action(s) can indicate to stay behind, follow, stay ahead of, etc. an object. The vehicle actions can vary from one time step to the next within a vehicle action sequence. Such variability (e.g., within a certain time period) can help provide a more dynamically determined aspect of motion planning when compared with a vehicle action that is static or fixed during the same time period.

The vehicle action model 138 (e.g., the second model) can be a machine-learned model configured to determine a plurality of vehicle actions for the vehicle 104. The machine-learned vehicle action model can be or can otherwise include one or more various model(s) such as, for example, models utilizing boosted random forest techniques, support vector machines, neural networks (e.g., deep neural networks), or other multi-layer non-linear models. Neural networks can include convolutional neural networks, recurrent neural networks (e.g., long short-term memory recurrent neural networks), feed-forward neural networks, and/or other forms of neural networks.

Figure 2B:
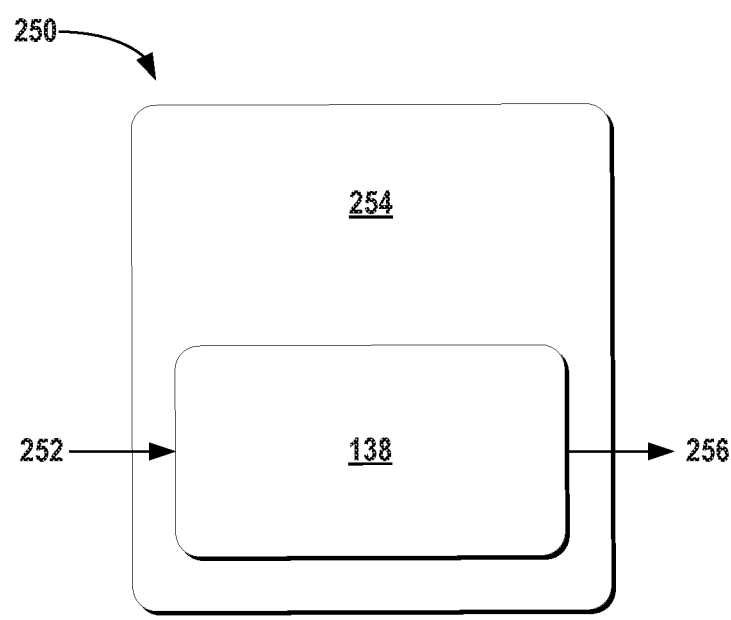

Training techniques can be performed to train the machine-learned vehicle action model to determine a vehicle action with respect to an object. For example, FIG. 2B depicts a diagram 250 of example model training according to example embodiments of the present disclosure. The vehicle action model 138 (e.g., a machine-learned vehicle action model) can be trained based on a set of training data 252. For instance, the machine-learned vehicle action can be trained using supervised training techniques based on the training data 252. The training data 252 can include labelled driving log data.

With reference again to FIG. 3, the labelled driving log data can include a first set of labels and a second set of labels. As described herein, the first set of labels (e.g., labels 310A-D) can be indicative of whether a training object (e.g., first training object 304A) is considered to be blocking or not blocking at a plurality of respective training time steps (and/or a plurality of locations along a trajectory). In some implementations, the first set of labels can be human-labelled, as described herein. In some implementations, at least a portion of the training data 202 utilized for the blocking model 136 can be utilized to train the vehicle action model 136. In some implementations, outputs from the blocking model 136 (e.g., a series of blocking decisions, etc.) can be utilized as training data for the vehicle action model 138 to determine a vehicle action given the blocking state of the object.

For training the vehicle action model 138, the labelled driving log data can include a second plurality of labels 312A-E that indicate a training vehicle action at each of the respective training time steps. The second set of labels 312A-E can indicate an appropriate training vehicle action at each of the respective training time steps. Such labels can also indicate a vehicle action based at least in part on the locations 306A-E of the object associated with the trajectory 307. For example, the second set of labels 312A and 312E can indicate that the vehicle 304 is to pass (e.g., shown as "P") the first training object 304A at T=0 and T=4 (e.g., when the object is not blocking the vehicle 304). The second set of labels 312B-D can indicate that the vehicle 304 is to queue for (e.g., decelerate for, stop for, yield for, etc.) the first training object 304A at T=1-3 (e.g., when the object is blocking the vehicle 304). Additionally, or alternatively, a set of labels 314A-C can be associated with the second training object 304B. These labels can indicate, for example, that the vehicle 304 should stay ahead of the second training object 304B at T=7-9 (e.g., shown as "SA") since vehicle 304 is already passed the second training object 304 at these times, despite the object being located within the travel way 302. In some implementations, the second set of labels 312A-E, 314A-C can be human-labelled by humans that review the driving log data. In some implementations, the second set of labels 312A-E, 314A-C can be machine-labelled. For instance, a computing system can be configured to automatically label the driving log data (e.g., based on rule(s) and/or a model) with second set of labels 312A-E, 314A-C based at least in part on a first set of labels indicating whether a training object is considered to be blocking or not blocking and/or other data such as, for example, map data associated with the driving log data, data indicative of the parameters of the vehicle 304 (e.g., speed, acceleration, etc.) at the time steps, weather data, etc. In this way, the labelled driving log data can be created for use in the training data 252.

Returning to FIG. 2B, a model trainer 254 can obtain the training data 252 from memory (e.g., training database). The model trainer 254 can be the same as or different from (at least partially) the model trainer 204. The training data 252 can include the labelled driving log as described, for example, with reference to FIG. 3. For instance, the training data 252 can include labelled driving log data that includes a first plurality of labels (e.g., labels 310A-E) that indicate whether a training object (e.g., first training object 304A) is considered to be blocking or not blocking at a plurality of respective training time steps, and a second plurality of labels (e.g., labels 312A-E) that indicate a training vehicle action at each of the respective training time steps. These labels can be utilized as ground-truth data to determine the accuracy and/or development of the vehicle action model 138 as it is trained. The training data 252 can also be indicative of the trajectory (e.g., trajectory 307) of a training object (e.g., first training object 304A). The model trainer 254 can train and/or build the vehicle action model 138 using the training data 252. The model trainer 254 can evaluate a training output 256 of the vehicle action model 138 to determine the accuracy and/or confidence level of the model as it is trained over time. The model trainer 254 can continue to train the vehicle action model 138 until a sufficient level of accuracy and/or confidence is achieved. Such training can help build and/or refine the vehicle action model 138 to more accurately determine a vehicle action at each respective time step.

Figure 4:
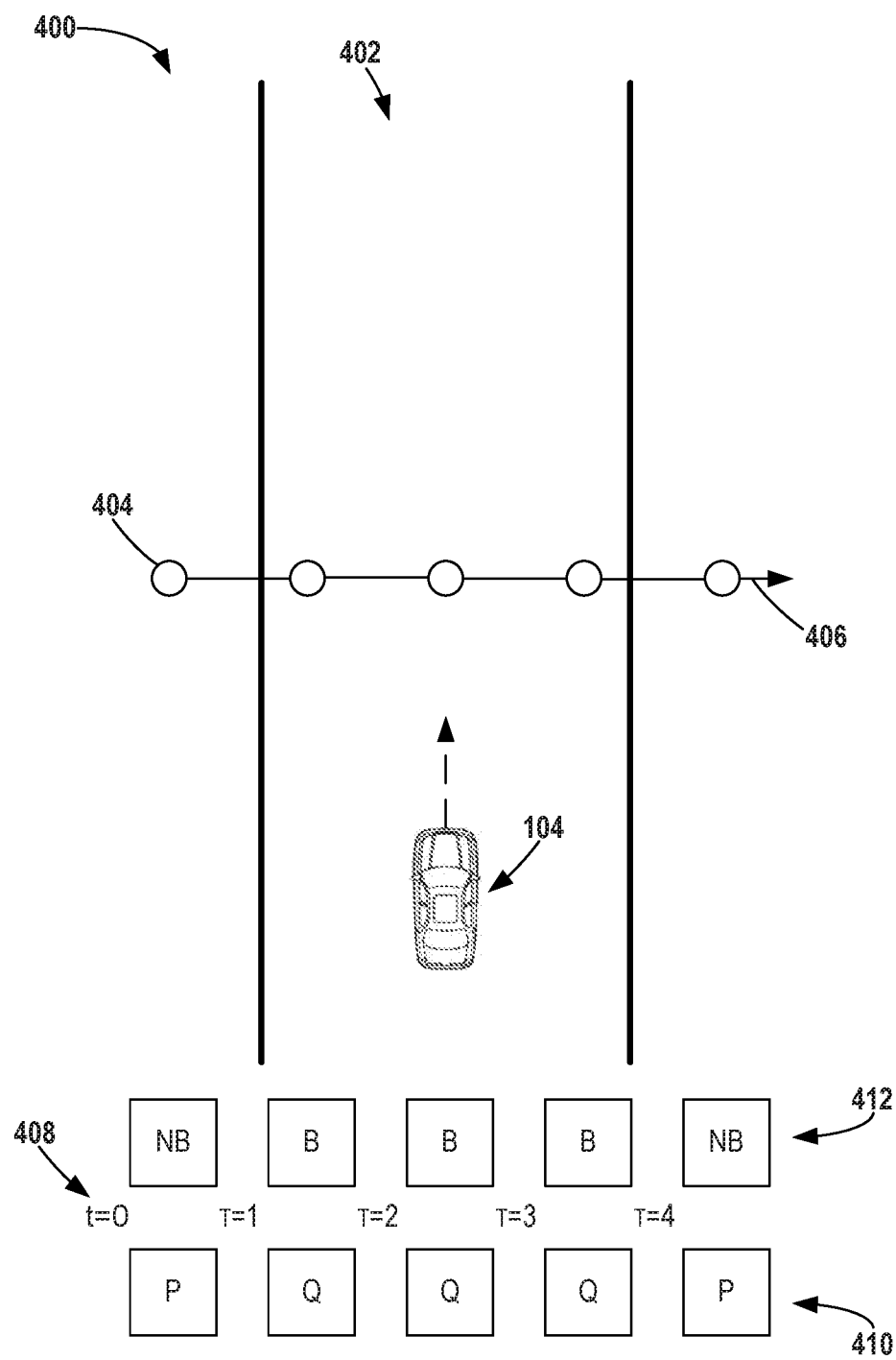
FIG. 4 depicts a diagram of an example travel way according to example embodiments of the present disclosure.

Once trained, the vehicle computing system 102 can determine a plurality of vehicle actions for the vehicle 104 based at least in part on data associated with an object, the motion trajectory of the vehicle (e.g., indicate of future vehicle motion), the blocking model 136, and/or the vehicle action model 138. For instance, FIG. 4 depicts a diagram 400 of an example travel way 402 according to example embodiments of the present disclosure. The vehicle 104 can be travelling within the travel way 402. An object 404 can be located within the surrounding environment of the vehicle 104. The vehicle computing system 102 of the vehicle 104 can perceive the object 404 based at least in part on sensor data 118 indicative of the object. The vehicle computing system 102 can generate state data 130 associated with the object 404. The vehicle computing system 102 can determine a predicted motion trajectory 406 of the object 404 (e.g., based on the state data 130). The predicted motion trajectory 406 can include a plurality of predicted future locations (and/or states) of the object 404 at a plurality of respective time steps 408. Each respective time step can be associated with a time interval, point in time, etc. of a predicted motion trajectory 406 of the object 404.

The vehicle computing system 102 can utilize the blocking model 136 and the vehicle action model 138 to determine vehicle action(s) that the vehicle 104 should take with respect to the object 404 and/or the object's predicted motion trajectory 406. At each respective time step of a plurality of time steps, the vehicle computing system 102 can determine whether the object 404 is blocking or not blocking the vehicle 104 based at least in part on the predicted motion trajectory 406 of the object 404. This determination can also be based at least in part on the motion trajectory of the vehicle 104 (e.g., the latest planned future motion trajectory of the vehicle 104). For instance, the vehicle computing system 102 can input data into the blocking model 136 and receive an output. For instance, the vehicle computing system 102 can obtain data indicative of the blocking model 136 from an accessible memory onboard the vehicle 104 and/or from a memory that is remote from the vehicle 104 (e.g., via a wireless network). The vehicle computing system 102 can input data indicative of the predicted motion trajectory 406 of the object 404 into the blocking model 136. In some implementations, the vehicle computing system 102 can input other data into the blocking model 136 such as, for example, map data 120 (e.g., associated with the area in which the vehicle 104 and/or object 404 are located), data associated with the vehicle (e.g., speed, heading, location within lane, etc.), data indicative of the motion trajectory of the vehicle 104, and/or other data. In some implementations, output data from the blocking model 136 can be utilized as input data for a subsequent determination. The blocking model 136 can process the data to determine whether the object is blocking or is not blocking the vehicle 104 at each respective time step of the predicted motion trajectory 406. For instance, at each time step, the blocking model 136 can determine if the object 404 is blocking the vehicle 104 based on the predicted position of that object 404 (e.g., within a travel lane), relative to the vehicle's planned path, etc. By way of example, the object 404 (e.g., a pedestrian) can be considered to not be blocking the vehicle 104 at the first and last time steps (e.g., before T=1 and after T=4) of FIG. 4 in the event that the object 404 is located out of the travel lane (e.g., on the sidewalk, out of the street). The object 404 can be considered to be blocking the vehicle 104 at the intermediate time steps of FIG. 4 (e.g., after T=1 and before T=4) in the event that the object 404 is located ahead of the vehicle 104 and in a travel lane (e.g., within the travel way 402) in which the vehicle 104 is located. In some implementations, the blocking decision determined for a respective time step can be determined based at least in part on the blocking decision determined for one or more previous time steps.

The vehicle computing system 102 can receive an output from the blocking model 136. The output can include data indicative of the whether the object 404 is blocking or not blocking the vehicle 104 at each of the respective time steps. Such data can include, for example, a series of blocking decisions 412 that includes a blocking decision at each time step (e.g., one second interval, etc.) of the time period (e.g., ten second time period, etc.) associated with the predicted motion trajectory 406 of the object 404. In some implementations, the times steps can be fixed (e.g., one second fixed intervals). In some implementations, the time steps can be varied (e.g., with some time steps shorter or longer than others). In some implementations, the time steps can be sampled at a fixed resolution and/or frequency. In some implementations, the time steps can be sampled at a varied resolution and/or frequency. For example, the vehicle computing system 102 can utilize a higher frequency of time steps toward the end of the predicted motion trajectory 406 where the predicted future location(s) of the object 404 may be less accurate.

The vehicle computing system 102 can determine a vehicle action sequence 410 for the vehicle 104 based at least in part on data indicative of whether the object 404 is blocking or not blocking the vehicle 104 at each respective time step. The vehicle computing system 102 can provide input data into the vehicle action model 138 and receive an output. For instance, the vehicle computing system 102 can obtain data indicative of the vehicle action model 138 from an accessible memory onboard the vehicle 104 and/or from a memory that is remote from the vehicle 104 (e.g., via a wireless network). The vehicle computing system 102 can provide input data into the vehicle action model 138. The input data can include, for example, the data indicative of the whether the object is blocking or not blocking the vehicle 104 at each of the respective time steps (e.g., the output of the blocking model 136), data associated with the vehicle 104 (e.g., heading, speed, acceleration, trajectory, etc.), one or more features associated with the object (as described herein), data indicative of the predicted motion trajectory 406 of the object 404 within the surrounding environment, and/or other data. In some implementations, an output of the vehicle action model 138 can be utilized as input data for a subsequent determination. The vehicle action model 138 can process the input data to determine a vehicle action at each respective time step of the predicted trajectory. For instance, at each time step, the vehicle action model 138 can determine that the vehicle 104 should pass the object, queue behind the object, or ignore the object. By way of example, the vehicle action model 138 can determine that the vehicle 104 can pass the object 404 when it is not blocking the vehicle 104 (e.g., before T=1 and after T=4 when the pedestrian is located on the sidewalk, out of the street). In another example, the vehicle action model 138 can determine that the vehicle 104 should queue behind the object 404 (e.g., decelerate, stop, etc.) in the event that the object 404 is blocking the vehicle 104 (e.g., after T=1 and before T=4 when the pedestrian is located ahead of the vehicle 104 in the travel lane) and the vehicle 104 would not be able to pass the object 404 with sufficient clearance with the time and distance to the object 404. In some implementations, the vehicle action determined for a respective time step can be determined based at least in part on the vehicle action determined for one or more previous time steps.

The vehicle computing system 102 can receive an output from the vehicle action model 138. The output can include data indicative of a vehicle action sequence 410. The vehicle action sequence 410 can include a plurality of vehicle actions. The vehicle action sequence can be indicative of a vehicle action for the vehicle 104 at each respective time step. For instance, the vehicle action sequence 410 can include the discrete vehicle action decided for each respective time step of the predicted motion trajectory of the object 404.

Figure 5:
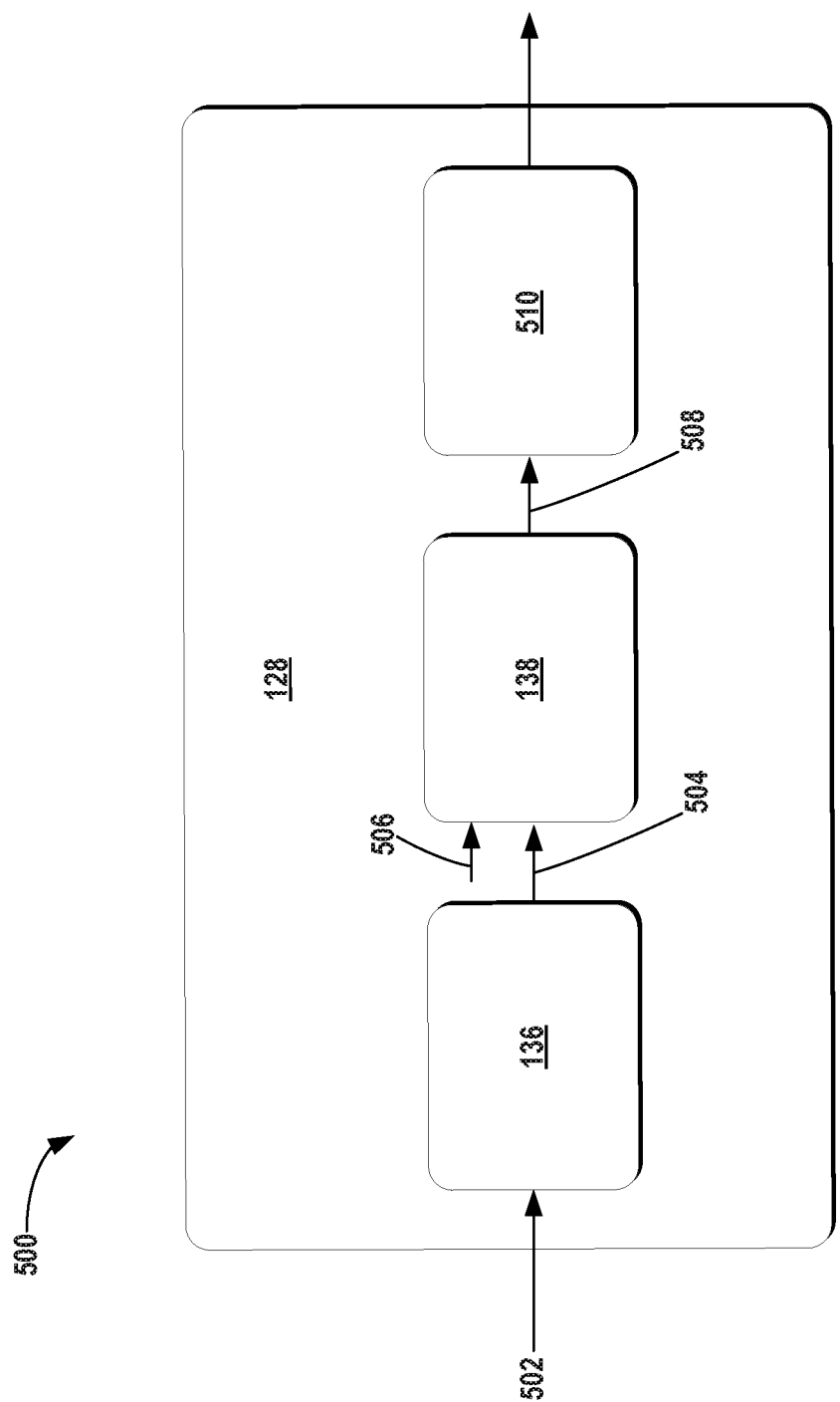
FIG. 5 depicts an example processing pipeline according to example embodiments of the present disclosure.

The vehicle computing system 102 can determine a motion of the vehicle 104 based at least in part on the vehicle action sequence (e.g., the plurality of vehicle actions). For instance, FIG. 5 depicts an example processing pipeline 500 according to example embodiments of the present disclosure. The vehicle computing system (e.g., the motion planning system 128) can utilize the processing pipeline 500 to implement the blocking model 136 and the vehicle action model 138 to plan the motion of the vehicle 104. For example, as described herein, the vehicle computing system 102 can provide an input 502 (e.g., the predicted motion trajectory of an object) into the blocking model 136 and receive an output 504. The output 504 can be indicative of whether an object is blocking or is not blocking the vehicle 104 at a plurality of respective times (e.g., blocking decision listing 412). The output 504 of the blocking model 136 (and/or another set of data indicative of the blocking decisions) and other data (e.g., the predicted motion trajectory of the object, state data, feature data, planned vehicle motion trajectory, other vehicle data, etc.) can be provided as an input to the vehicle action model 138. The vehicle computing system 102 can receive an output 508 from the vehicle action model 138. As described herein, the output 508 can be indicative of a vehicle action sequence 410. The output 508 (and/or another set of data indicative of the vehicle action sequence) can be provided to an optimizer 510.

The vehicle computing system 102 can determine a motion plan for the vehicle 104 based at least in part on the vehicle action sequence 410. For instance, the vehicle computing system 102 (e.g., the motion planning system 128) can generate cost data associated with each vehicle action of the vehicle action sequence. The cost data can be indicative of an effect of performing the respective vehicle action for each time step. The cost data can include a cost function indicative of a cost (e.g., over time) of controlling the motion of the vehicle 104 (e.g., the trajectory, speed, or other controllable parameters of the vehicle) to perform the respective vehicle action (e.g., pass, queue behind, ignore, stay ahead, stay behind, etc.). The vehicle computing system 102 can determine a motion plan 134 for the vehicle 104 based at least in part on the cost data. For example, the optimizer 510 can consider the cost data associated with the respective vehicle actions of the vehicle action sequence 410 as well as other cost functions to determine optimized variables that make up the motion plan. For example, based on the vehicle action sequence 410, the object 404 can be determined as a leading_actor, trailing_actor, pass_actor, and/or another type of actor. The vehicle computing system 102 (e.g., the motion planning system 128) can generate fences for the object 404 (e.g., ACC fences for leading_actors and push fences for trailing_actors). The vehicle computing system 102 can determine a planned motion trajectory for the vehicle 104 to follow based at least in part on these fences.

The vehicle computing system 102 can cause the vehicle 104 to initiate motion control in accordance with at least a portion of the motion plan 134. For example, the motion plan 134 can include a trajectory by which the vehicle 104 is to pass the object 404 with at least a passing distance margin between the vehicle 104 and the object 404. Moreover, the motion plan 134 can modulate the speed of the vehicle 104 such that the vehicle 104 queues behind and/or stops at a particular distance from the object 404. The motion plan 134 can be provided to a vehicle controller that is configured to implement the motion plan 134. For example, the vehicle controller can translate the motion plan into instructions for the vehicle control system(s) 116 (e.g., acceleration control, brake control, steering control, etc.). The vehicle control system(s) 116 can obtain the instructions and cause the vehicle 104 to travel in accordance with the motion control associated with the motion plan 134.

Figure 6:
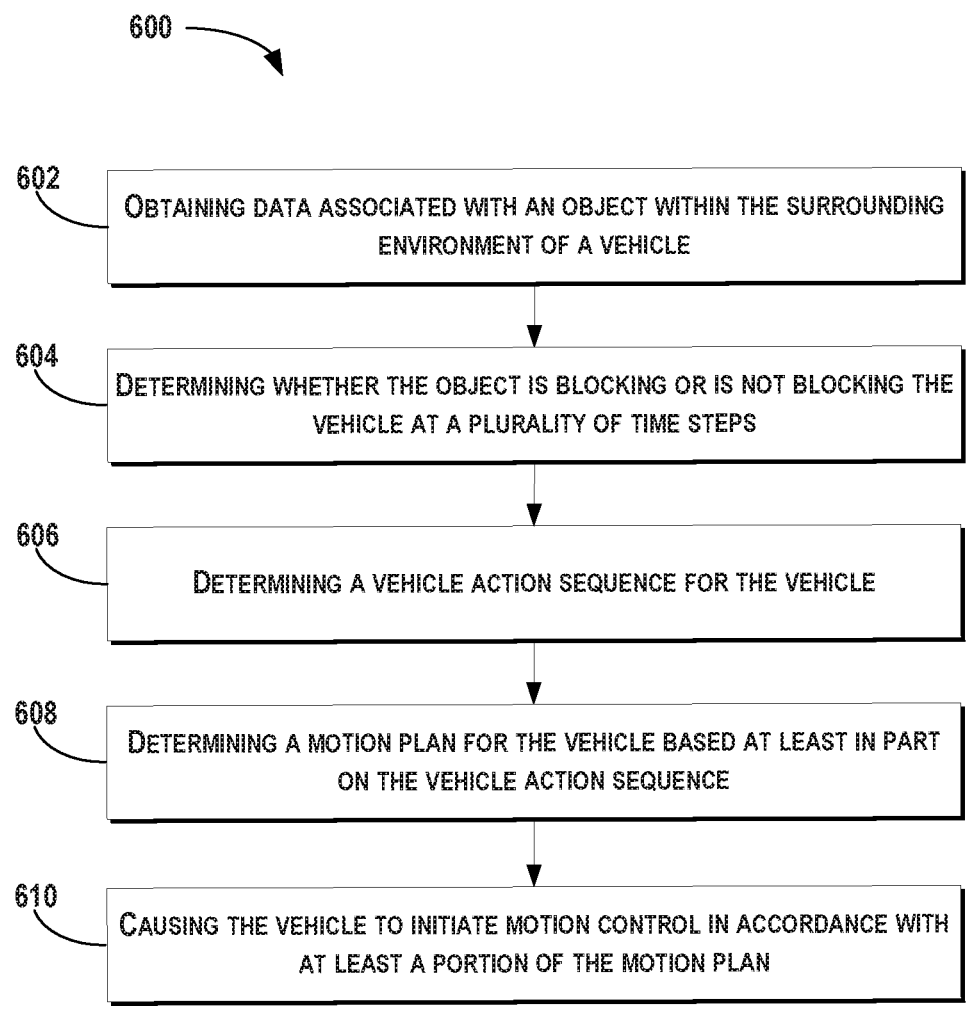
FIG. 6 depicts an example flow diagram of example method for controlling an autonomous vehicle according to example embodiments of the present disclosure.

FIG. 6 depicts a flow diagram of an example method 600 of controlling autonomous vehicle motion according to example embodiments of the present disclosure. One or more portion(s) of the method 600 can be implemented by a computing system (including one or more computing devices) such as, for example, the vehicle computing system 102. Moreover, one or more portion(s) of the method 600 can be implemented as an algorithm on the hardware components of the device(s) described herein (e.g., as in FIGS. 1 and 7) to, for example, control a vehicle and the motion thereof. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (602), the method 600 can include obtaining data associated with an object within the surrounding environment of a vehicle. For instance, the vehicle computing system 102 can obtain data associated with an object 404 within a surrounding environment of a vehicle 104. The data associated with the object 404 can be indicative of, for example, a predicted motion trajectory 406 of the object 404. Additionally, or alternatively, the data associated with the object 404 can include map data 120 associated with a geographic area in which the object 404 is located. The data can be indicative of one or more features associated with the object 404 (e.g., relative distance to the vehicle 104), as described herein. The vehicle computing system 102 can also obtain data associated with the vehicle 104 such as, for example, data indicative of a location of the vehicle 104 (e.g., within a travel lane), a speed of the vehicle, a heading of the vehicle, an acceleration of the vehicle, data indicative of a motion trajectory of the vehicle 104 (e.g., current and/or future planned motion trajectory), etc.

At (604), the method 600 can include determining whether the object is blocking or is not blocking the vehicle at a plurality of time steps. The vehicle computing system 102 can determine for each time step 408 associated with the predicted motion trajectory 406, whether the object 404 is blocking or not blocking the vehicle 104 based at least in part on the predicted motion trajectory 406 of the object 404 and, in some implementations, the motion trajectory of the vehicle 104 (e.g., indicating the future trajectory of the vehicle 104). The vehicle computing system 102 can do so based at least in part on a blocking model 136. As described herein, the blocking model 136 can be a machine-learned model or a rule(s)-based model. A machine-learned blocking model 136 can be trained based at least in part on training data 202 that includes labelled driving log data, as described herein. The vehicle 102 can obtain data descriptive of a blocking model 136 (e.g., from an accessible memory). The vehicle computing system 102 can input data indicative of the predicted motion trajectory 406 of the object 404 into the blocking model 136. The vehicle computing system can also input data indicative of the motion trajectory of the vehicle 104 into the blocking model 136. The vehicle computing system 102 can obtain, as an output from the blocking model 136, data indicative of the whether the object 404 is blocking or not blocking the vehicle at each of the respective time steps 408.

At (606), the method 600 can include determining a vehicle action sequence for the vehicle. For instance, the vehicle computing system 102 can determine a vehicle action sequence 410 based at least in part on the predicted motion trajectory 406 of the object 404. The vehicle action sequence 410 can be indicative of a plurality of vehicle actions for the vehicle 104 at a plurality of respective time steps 408 associated with the predicted motion trajectory 406. The time steps can be associated with the frequency/resolution of the predicted future locations of the object 404 (e.g., the frequency/resolution with which the prediction system 126 predicts a future location of the object 404 for a particular prediction cycle). This can include, for example, one second time steps over a ten second horizon.

The vehicle computing system 102 can determine a respective vehicle action for the vehicle 104 at each of the respective time steps based at least in part on whether the object is blocking or not blocking the vehicle 104 at the respective time step. Such determination can be based at least in part on a vehicle action model 138. As described herein, the vehicle action model 138 can be a machine-learned vehicle action model. The machine-learned vehicle action model can be trained at least in part on training data 252 that includes labelled driving log data, as described herein. For instance, the labelled driving log data can include a first plurality of labels (e.g., labels 310A-E) that indicate whether a training object (e.g., first training object 304A) is considered to be blocking or not blocking at a plurality of respective training time steps. The labelled driving log data can include a second plurality of labels (e.g., labels 312A-E) that indicate a training vehicle action at each of the respective training time steps. As described herein, the first plurality of labels can be human-labelled and the second plurality of labels can be machine-labelled.

The vehicle computing system 102 can obtain data indicative of a machine-learned vehicle action model (e.g., from an accessible memory). The vehicle computing system 102 can provide input data into the machine-learned vehicle action model. The input data can include data associated with the vehicle 104 (e.g., dynamic parameters associated therewith) and the data indicative of the whether the object 404 is blocking or not blocking the vehicle 104 at each of the respective time steps 408. In some implementations, the input data can further include data indicative of one or more features associated with the object 404. In some implementations, the input data can further include data indicative of the predicted motion trajectory 406 of the object 404 within the surrounding environment and/or data indicative of the future motion trajectory of the vehicle 104. The vehicle computing system 102 can obtain, as an output from the machine-learned vehicle action model, data indicative of the vehicle action sequence 410. The vehicle action sequence 410 can be indicative of a plurality of vehicle actions. Each of the plurality of vehicle actions can be indicative of a respective vehicle action at a respective time step. For instance, an action of the plurality of vehicle actions can include one of passing the object 404, ignoring the object 404, or queuing behind the object 404.

At (608), the method 600 can include determining a motion plan for the vehicle based at least in part on the vehicle action sequence. The vehicle computing system 102 can determine a motion plan 134 for the vehicle 104 based at least in part on the vehicle action sequence 410. For instance, the vehicle computing system 102 can consider each of the vehicle actions of the vehicle action sequence 410 as it determines the motion plan 134 for the vehicle 104. This can be done during the cost data analysis performed by the vehicle's motion planning system 128, as described herein. In some implementations, one or more of the vehicle actions may not ultimately change the motion plan 134 (e.g., because another factor, like a fallen tree, greatly outweighs the decision to pass an object). In some implementations, the motion plan 128 can include one or more planned vehicle trajectories that can be implemented to cause the vehicle to act in accordance with one or more of the vehicle actions of the vehicle action sequence 410.

At (610), the method 600 can include causing the vehicle to initiate motion control in accordance with at least a portion of the motion plan. For instance, the vehicle computing system 102 can cause the vehicle 104 to initiate motion control in accordance with at least a portion of the motion plan 134. This can include, for example, providing data associated with at least a portion of the motion plan 134 to a vehicle controller (e.g., an interface) that is configured to communicate at least a portion of the motion plan (e.g., a translated version) to the vehicle control system(s) 116. This can also include the sending of one or more command signals to cause the vehicle 104 to implement motion control in accordance with the motion plan 134.

Figure 7:
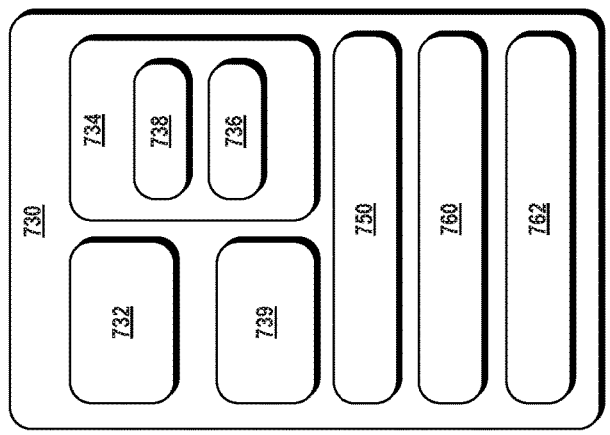
FIG. 7 depicts example system components according to example embodiments of the present disclosure.
Figure 7:
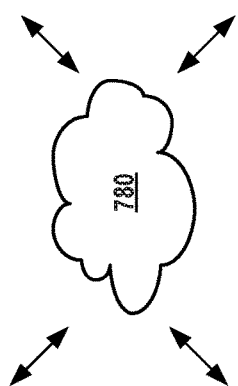
Figure 7:
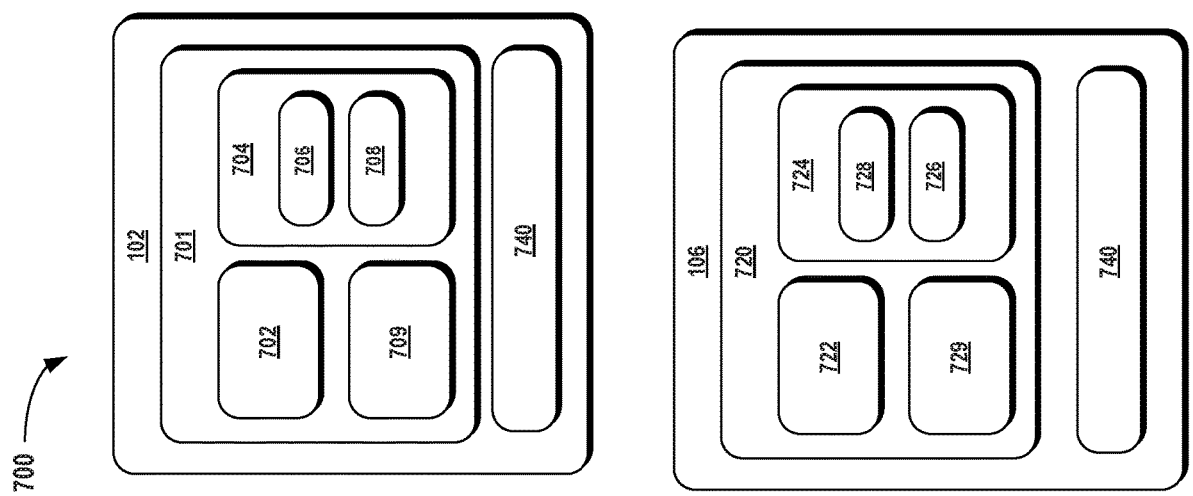

FIG. 7 depicts example system components of an example system 700 according to example embodiments of the present disclosure. The example system 700 can include the vehicle computing system 102, the operations computing system 106, and a machine learning computing system 730 that are communicatively coupled over one or more network(s) 780.

The vehicle computing system 102 can include one or more computing device(s) 701. The computing device(s) 701 of the vehicle computing system 102 can include processor(s) 702 and a memory 704 (e.g., onboard the vehicle 104). The one or more processors 702 can be any suitable processing device (e.g., a processor core, a microprocessor, an ASIC, a FPGA, a controller, a microcontroller, etc.) and can be one processor or a plurality of processors that are operatively connected. The memory 704 can include one or more non-transitory computer-readable storage media, such as RAM, ROM, EEPROM, EPROM, one or more memory devices, flash memory devices, etc., and combinations thereof.

The memory 704 can store information that can be obtained by the one or more processors 702. For instance, the memory 704 (e.g., one or more non-transitory computer-readable storage mediums, memory devices) can include computer-readable instructions 706 that can be executed by the one or more processors 702. The instructions 706 can be software written in any suitable programming language or can be implemented in hardware. Additionally, or alternatively, the instructions 706 can be executed in logically and/or virtually separate threads on processor(s) 702.

For example, the memory 704 can store instructions 706 that when executed by the one or more processors 702 cause the one or more processors 702 (the computing system 102) to perform operations such as any of the operations and functions of the vehicle computing system 102, the vehicle 104, or for which the vehicle computing system 102 is configured, as described herein, the operations for controlling a vehicle (e.g., one or more portions of method 600), and/or any other operations and functions for the vehicle computing system 102, as described herein.

The memory 704 can store data 708 that can be obtained (e.g., received, accessed, written, manipulated, generated, created, etc.) and/or stored. The data 708 can include, for instance, sensor data, state data, prediction data, data predict motion trajectories of objects, data indicative of model(s), input data, output data, data indicative of motion plans, map data, data associated with a vehicle, and/or other data/information described herein. In some implementations, the computing device(s) 701 can obtain data from one or more memories that are remote from the vehicle 104.

The computing device(s) 701 can also include a communication interface 709 used to communicate with one or more other system(s) on-board the vehicle 104 and/or a remote computing device that is remote from the vehicle 104 (e.g., the other systems of FIG. 7, etc.). The communication interface 709 can include any circuits, components, software, etc. for communicating via one or more networks (e.g., 780). In some implementations, the communication interface 709 can include, for example, one or more of a communications controller, receiver, transceiver, transmitter, port, conductors, software and/or hardware for communicating data/information.

The operations computing system 106 can perform the operations and functions for managing vehicles (e.g., a fleet of autonomous vehicles), providing and/or obtaining data to and/or from a vehicle, and/or otherwise described herein. The operations computing system 106 can be located remotely from the vehicle 104. For example, the operations computing system 106 can operate offline, off-board, etc. The operations computing system 106 can include one or more distinct physical computing devices.

The operations computing system 106 can include one or more computing devices 720. The one or more computing devices 720 can include one or more processors 722 and a memory 724. The one or more processors 722 can be any suitable processing device (e.g., a processor core, a microprocessor, an ASIC, a FPGA, a controller, a microcontroller, etc.) and can be one processor or a plurality of processors that are operatively connected. The memory 724 can include one or more non-transitory computer-readable storage media, such as RAM, ROM, EEPROM, EPROM, one or more memory devices, flash memory devices, etc., and combinations thereof.

The memory 724 can store information that can be accessed by the one or more processors 722. For instance, the memory 724 (e.g., one or more non-transitory computer-readable storage mediums, memory devices) can store data 726 that can be obtained. The data 726 can include, for instance, data indicative of model(s), data associated with vehicle(s), and/or other data or information described herein. In some implementations, the operations computing system 106 can obtain data from one or more memories that are remote from the operations computing system 106.

The memory 724 can also store computer-readable instructions 728 that can be executed by the one or more processors 722. The instructions 728 can be software written in any suitable programming language or can be implemented in hardware. Additionally, or alternatively, the instructions 728 can be executed in logically and/or virtually separate threads on processor(s) 722. For example, the memory 724 can store instructions 728 that when executed by the one or more processors 722 cause the one or more processors 722 to perform any of the operations and/or functions of the operations computing system 106 and/or other operations and functions.

The computing device(s) 720 can also include a communication interface 729 used to communicate with one or more other system(s). The communication interface 729 can include any circuits, components, software, etc. for communicating via one or more networks (e.g., 780). In some implementations, the communication interface 729 can include for example, one or more of a communications controller, receiver, transceiver, transmitter, port, conductors, software and/or hardware for communicating data/information.

According to an aspect of the present disclosure, the vehicle computing system 102 and/or the operations computing system 106 can store or include one or more models 740. As examples, the model(s) 740 can include the machine-learned models that can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), or other forms of neural networks. The models 740 can include the blocking model 136, the vehicle action model 138, and/or other model(s), as described herein.

In some implementations, the vehicle computing system 102 and/or the operations computing system 106 can receive the one or more models 740 (e.g., the machine-learned model(s)) from the machine learning computing system 730 over the network(s) 780 and can store the one or more models 740 in the memory of the respective system. The vehicle computing system 102 and/or the operations computing system 106 can use or otherwise implement the one or more models 740 (e.g., by processor(s) 702, 722). In particular, the vehicle computing system 102 and/or the operations computing system 106 can implement the model(s) 740 to determine whether an object is blocking a vehicle and/or a vehicle action sequence for the vehicle, as described herein.

The machine learning computing system 730 can include one or more processors 732 and a memory 734. The one or more processors 732 can be any suitable processing device (e.g., a processor core, a microprocessor, an ASIC, a FPGA, a controller, a microcontroller, etc.) and can be one processor or a plurality of processors that are operatively connected. The memory 734 can include one or more non-transitory computer-readable storage media, such as RAM, ROM, EEPROM, EPROM, one or more memory devices, flash memory devices, etc., and combinations thereof.

The memory 734 can store information that can be accessed by the one or more processors 732. For instance, the memory 734 (e.g., one or more non-transitory computer-readable storage mediums, memory devices) can store data 736 that can be obtained, received, accessed, written, manipulated, created, and/or stored. In some implementations, the machine learning computing system 730 can obtain data from one or more memories that are remote from the machine learning computing system 730.

The memory 734 can also store computer-readable instructions 738 that can be executed by the one or more processors 732. The instructions 738 can be software written in any suitable programming language or can be implemented in hardware. Additionally, or alternatively, the instructions 738 can be executed in logically and/or virtually separate threads on processor(s) 732. The memory 734 can store the instructions 738 that when executed by the one or more processors 732 cause the one or more processors 732 to perform operations. The machine learning computing system 730 can include a communication system 739, including devices and/or functions similar to that described with respect to the vehicle computing system 102 and/or the operations computing system 106.

In some implementations, the machine learning computing system 730 can include one or more server computing devices. If the machine learning computing system 730 includes multiple server computing devices, such server computing devices can operate according to various computing architectures, including, for example, sequential computing architectures, parallel computing architectures, or some combination thereof.

In addition or alternatively to the model(s) 740 at the vehicle computing system 102 and/or the operations computing system 106, the machine learning computing system 730 can include one or more machine-learned models 750. As examples, the machine-learned models 750 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory) recurrent neural networks, or other forms of neural networks. The machine-learned models 750 can be similar to and/or the same as the models 740 such as, for example, a machine-learned blocking model and/or a machine-learned vehicle action model.

As an example, the machine learning computing system 730 can communicate with the vehicle computing system 102 and/or the operations computing system 106 according to a client-server relationship. For example, the machine learning computing system 730 can implement the machine-learned models 750 to provide a web service to the vehicle computing system 102 and/or the operations computing system 106. For example, the web service can provide machine-learned models to an entity associated with a vehicle; such that the entity can implement the machine-learned model (e.g., to determine blocking decisions, vehicle actions, etc.). Thus, machine-learned models 750 can be located and used at the vehicle computing system 102 and/or the operations computing system 106 and/or machine-learned models 750 can be located and used at the machine learning computing system 730.

In some implementations, the machine learning computing system 730, the vehicle computing system 102, and/or the operations computing system 106 can train the models 740 and/or 750 (e.g., the machine-learned model(s)) through use of a model trainer 760. The model trainer 760 can train the machine-learned models using one or more training or learning algorithms. In some implementations, the model trainer can include the model trainer 204 and/or model trainer 254.

One example training technique is backwards propagation of errors. In some implementations, the model trainer 760 can perform supervised training techniques using a set of labeled training data. In other implementations, the model trainer 760 can perform unsupervised training techniques using a set of unlabeled training data. The model trainer 760 can perform a number of generalization techniques to improve the generalization capability of the models being trained. Generalization techniques include weight decays, dropouts, or other techniques.

In particular, the model trainer 760 can train a machine-learned model based on one or more sets of training data 762. The training data 762 can include, for example, a number of sets of data from previous events (e.g., driving log data associated with previously observed objects). In some implementations, the training data 762 can include the training data 202 and/or 252 described herein. In some implementations, the training data 762 can be taken from the same vehicle as that which utilizes that model 740/750. In this way, the models 740/750 can be trained to determine outputs in a manner that is tailored to that particular vehicle. Additionally, or alternatively, the training data 762 can be taken from one or more different vehicles than that which is utilizing that model 740/750. The model trainer 760 can be implemented in hardware, firmware, and/or software controlling one or more processors.

The network(s) 780 can be any type of network or combination of networks that allows for communication between devices. In some embodiments, the network(s) 780 can include one or more of a local area network, wide area network, the Internet, secure network, cellular network, mesh network, peer-to-peer communication link and/or some combination thereof and can include any number of wired or wireless links. Communication over the network(s) 780 can be accomplished, for instance, via a network interface using any type of protocol, protection scheme, encoding, format, packaging, etc.

FIG. 7 illustrates one example system 700 that can be used to implement the present disclosure. Other computing systems can be used as well. For example, in some implementations, the vehicle computing system 102 and/or the operations computing system 106 can include the model trainer 760 and the training dataset 762. In such implementations, the models 740 can be both trained and used locally at the vehicle computing system 102 and/or the operations computing system 106. As another example, in some implementations, the vehicle computing system 102 and/or the operations computing system 106 may not be connected to other computing systems.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of controlling autonomous vehicle motion, comprising:
    obtaining, by a computing system comprising one or more computing devices, data associated with an object within a surrounding environment of an autonomous vehicle, wherein the data associated with the object is indicative of a predicted motion trajectory of the object;
    determining, by the computing system, a vehicle action sequence based at least in part on the predicted motion trajectory of the object, wherein the vehicle action sequence is indicative of a plurality of vehicle actions for the autonomous vehicle at a plurality of respective time steps associated with the predicted motion trajectory;
    determining, by the computing system, a motion plan for the autonomous vehicle based at least in part on the vehicle action sequence; and
    causing, by the computing system, the autonomous vehicle to initiate motion control in accordance with at least a portion of the motion plan.

2. The computer-implemented method of claim 1, wherein determining, by the computing system, the vehicle action sequence comprises:

determining for each time step, by the computing system, whether the object is blocking or not blocking the autonomous vehicle based at least in part on the predicted motion trajectory of the object and a motion trajectory of the autonomous vehicle; and determining, by the computing system, a respective vehicle action for the autonomous vehicle at each of the respective time steps based at least in part on whether the object is blocking or not blocking the autonomous vehicle at the respective time step.

3. The computer-implemented method of claim 2, wherein determining for each time step, by the computing system, whether the object is blocking or not blocking the autonomous vehicle based at least in part on the predicted motion trajectory of the object comprises:

obtaining, by the computing system, data descriptive of a blocking model;

inputting, by the computing system, data indicative of the predicted motion trajectory of the object into the blocking model; and obtaining, by the computing system as an output from the blocking model, data indicative of whether the object is blocking or not blocking the autonomous vehicle at each of the respective time steps.

4. The computer-implemented method of claim 3, further comprising inputting data indicative of the motion trajectory of the autonomous vehicle into the blocking model.

5. The computer-implemented method of claim 3, wherein the blocking model is a machine-learned model, and wherein the machine-learned model is trained based at least in part on training data that comprises labelled driving log data.

6. The computer-implemented method of claim 2, wherein determining, by the computing system, the respective vehicle action for the autonomous vehicle at each of the respective time steps comprises:

obtaining, by the computing system, data indicative of a machine-learned vehicle action model;

providing, by the computing system, input data into the machine-learned vehicle action model, wherein the input data comprises data associated with the autonomous vehicle and the data indicative of the whether the object is blocking or not blocking the autonomous vehicle at each of the respective time steps; and obtaining, by the computing system as an output from the machine-learned vehicle action model, data indicative of the vehicle action sequence.

7. The computer-implemented method of claim 6, wherein the machine-learned vehicle action model is trained at least in part on training data that comprises labelled driving log data, wherein the labelled driving log data comprises a first plurality of labels that indicate whether a training object is considered to be blocking or not blocking at a plurality of respective training time steps, and a second plurality of labels that indicate a training vehicle action at each of the respective training time steps.

8. The computer-implemented method of claim 7, wherein the first plurality of labels are human-labelled and wherein the second plurality of labels are machine-labelled.

9. The computer-implemented method of claim 6, wherein the input data further comprises data indicative of one or more features associated with the object.

10. The computer-implemented method of claim 6, wherein the input data further comprises data indicative of the predicted motion trajectory of the object within the surrounding environment.

11. The computer-implemented method of claim 1, wherein an action of the plurality of vehicle actions comprises one of passing the object, ignoring the object, or queuing behind the object.

12. A computing system for controlling autonomous vehicle motion, comprising:

one or more processors; and one or more non-transitory computer-readable media that collectively store instructions that when executed by the one or more processors cause the one or more processors to perform operations comprising:

obtaining data associated with an object within a surrounding environment of an autonomous vehicle, wherein the data associated with the object is indicative of a predicted motion trajectory of the object;

determining, at each respective time step of a plurality of time steps, whether the object is blocking or not blocking the autonomous vehicle based at least in part on the predicted motion trajectory of the object and a motion trajectory of the autonomous vehicle;

determining a vehicle action sequence for the autonomous vehicle based at least in part on data indicative of whether the object is blocking or not blocking the autonomous vehicle at each respective time step, wherein the vehicle action sequence is indicative of a plurality of vehicle actions for the autonomous vehicle at one or more of the plurality of time steps; and determining a motion of the autonomous vehicle based at least in part on the vehicle action sequence.

13. The computing system of claim 12, wherein the vehicle action sequence is indicative of a vehicle action for the autonomous vehicle at each respective time step.

14. The computing system of claim 12, wherein determining, at each respective time step of the plurality of time steps, whether the object is blocking or not blocking the autonomous vehicle comprises:

determining that the object s blocking or not blocking the autonomous vehicle based at least in part on a first model.

15. The computing system of claim 12, wherein determining the vehicle action sequence comprises:

determining the vehicle action sequence for the autonomous vehicle based at least in part on a second model, wherein the second model is a machine-learned model.

16. The computing system of claim 12, wherein determining the motion of the autonomous vehicle based at least in part on the vehicle action sequence comprises:

determining a motion plan for the autonomous vehicle based at least in part on the vehicle action sequence.

17. The computing system of claim 16, wherein determining the motion plan for the autonomous vehicle based at least in part on the vehicle action sequence comprises:

generating cost data associated with each vehicle action of the vehicle action sequence.

18. The computing system of claim 16, wherein the operations further comprise:

causing the autonomous vehicle to initiate motion control in accordance with at least a portion of the motion plan.

19. An autonomous vehicle; comprising:

a blocking model configured to determine whether an object within a surrounding environment of the autonomous vehicle is blocking or not blocking the autonomous vehicle at a time along a predicted motion trajectory of the object;

a vehicle action model that is configured to determine a plurality of vehicle actions for the autonomous vehicle;

one or more processors; and one or more non-transitory computer-readable media that collectively store instructions that, when executed by the one or more processors, cause the one or more processors to perform operations comprising:

obtaining data associated with the object within the surrounding environment of the autonomous vehicle;

determining the plurality of vehicle actions for the autonomous vehicle based at least in part on the data associated with the object, the blocking model, and the vehicle action model;

determining a motion for the autonomous vehicle based at least in part on the plurality of vehicle actions.

20. The autonomous vehicle of claim 19, wherein each of the plurality of vehicle actions is indicative of a respective vehicle action at a respective time step, wherein each respective vehicle action is indicative of a suggested motion of the autonomous vehicle with respect to the object.

* * * * *